(12) United States Patent
Shintani et al.

(10) Patent No.: US 6,980,079 B1
(45) Date of Patent: Dec. 27, 2005

(54) CONTROL NETWORK SYSTEM OF HOUSEHOLD ELECTRIC APPLIANCE

(75) Inventors: Yasuyuki Shintani, Nishinomiya (JP); Reiko Ueno, Takarazuka (JP)

(73) Assignee: Matsushita Electric Industrial Co., Ltd., (JP)

( * ) Notice: Subject to any disclaimer, the term of this patent is extended or adjusted under 35 U.S.C. 154(b) by 548 days.

(21) Appl. No.: 09/787,030

(22) PCT Filed: Jul. 13, 2000

(86) PCT No.: PCT/JP00/04718

§ 371 (c)(1),
(2), (4) Date: Mar. 13, 2001

(87) PCT Pub. No.: WO01/05186

PCT Pub. Date: Jan. 18, 2001

(30) Foreign Application Priority Data

Jul. 13, 1999 (JP) .................................. 11-199145

(51) Int. Cl.⁷ .......................... H04Q 9/00; H04L 12/28
(52) U.S. Cl. .................. 340/3.1; 340/3.51; 340/825.24
(58) Field of Search ............................... 340/3.1, 3.51, 340/825.22, 825.24, 825.25, 521, 286.01, 340/825.52; 348/61; 369/2

(56) References Cited

U.S. PATENT DOCUMENTS

| | | | |
|---|---|---|---|
| 4,801,924 A | * | 1/1989 | Burgmann et al. ........... 340/521 |
| 4,808,992 A | * | 2/1989 | Beyers, Jr. et al. ...... 340/825.24 |
| 4,989,081 A | * | 1/1991 | Miyagawa et al. ............ 348/61 |
| 5,237,305 A | * | 8/1993 | Ishikuro et al. ......... 340/286.01 |
| 5,499,018 A | * | 3/1996 | Welmer ...................... 340/3.51 |
| 5,537,104 A | * | 7/1996 | Van Dort et al. ........ 340/825.52 |
| 5,565,855 A | * | 10/1996 | Knibbe ...................... 340/3.51 |
| 5,802,017 A | * | 9/1998 | Sato et al. ...................... 369/2 |
| 6,018,690 A | | 1/2000 | Saito et al. .................. 700/295 |

FOREIGN PATENT DOCUMENTS

EP 0 853 401 7/1998 ........... H04L 12/28

OTHER PUBLICATIONS

Nikkei MultiMedia No. 33, "Technology Finder," Apr. 1998, pp 70-75 (partial translation).
Nikkei Communications, "Domestic Network," Apr. 20, 1998, pp138-147 (partial translation).
Denki Hyoron, "Epoch-Making Remote Supervisory Control System of Electric Appliances Through the Internet," Jun. 30, 1998, pp 68-72 (partial translation).
Computer & Network LAN, "Home Network Design Proposed by Electric Power Companies," Mar. 1999, vol. 17, pp 32-36 & 120 (partial translation).

(Continued)

*Primary Examiner*—Edwin C. Holloway, III
(74) *Attorney, Agent, or Firm*—Steptoe & Johnson LLP

(57) ABSTRACT

In a control network system of household electric appliances, particularly, an each introduction of a household electric appliance thereto does not cause a change in the means of acquiring operation data by a controller, and the electric power consumption of a controller is made less.

A home network system is simplified and made efficient.

As a means for the above, an accessible device in a common manner to household electric appliances is incorporated into a controller by object processing using communications middlewares, and a device for linked operations is incorporated into household electric appliances. Then, it is noted that each household electric appliance needs a specific kind of another appliance and operation data thereof.

35 Claims, 15 Drawing Sheets

OTHER PUBLICATIONS

National Technical Report, "Test System of Total Network Based on HBS," Dec. 1991, vol. 37, No. 6, pp 687-694 (partial translation).

Barry Haaser, "Control Networks Extend Energy Management Solutions," ElectroTechnology. Feb./Mar. 1996, pp11-13.

Maury Wright, "Low-Cost Control LANs Add Automation to Homes, Autos, and Offices," EDN-Technology, Jul. 20, 1992, pp 182-188.

Standard of Electronic Industries Association of Japan-Technical Committee on HBS, "EIAJ ET-2101 Home Bus System (HBS)," Jan. 1990, pp 112-126.

* cited by examiner

Fig. 2
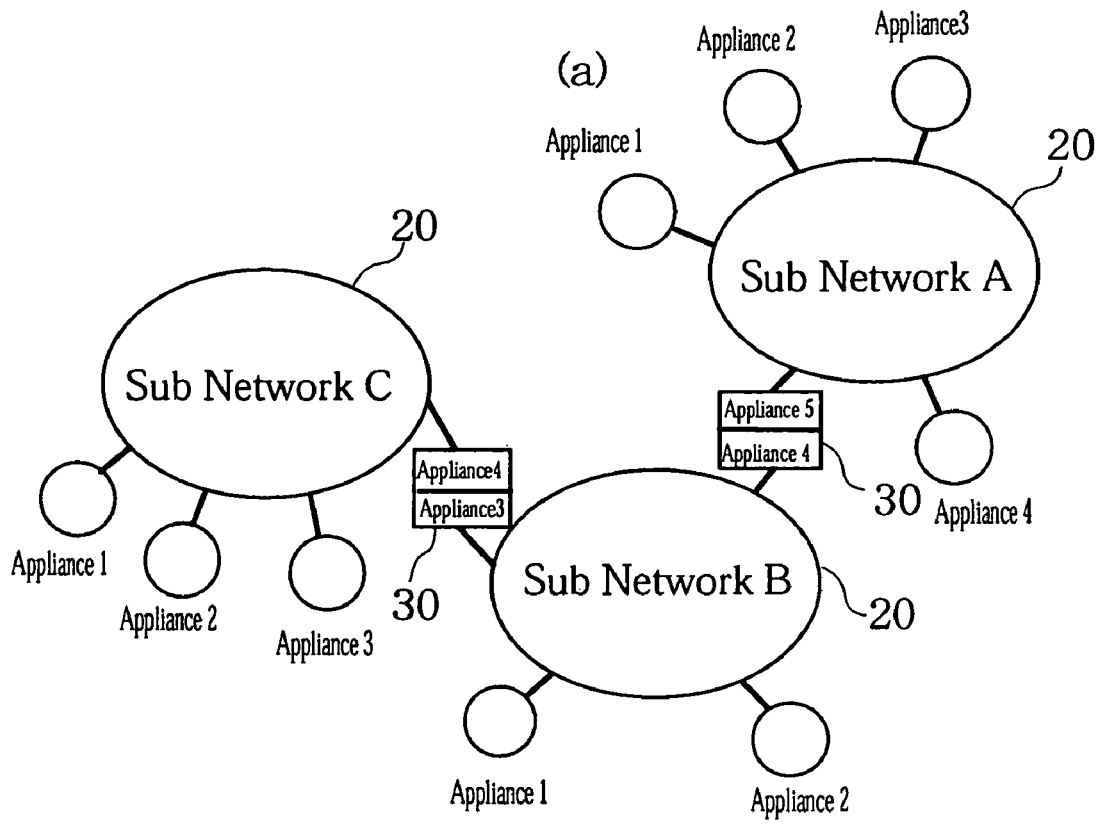
(a)
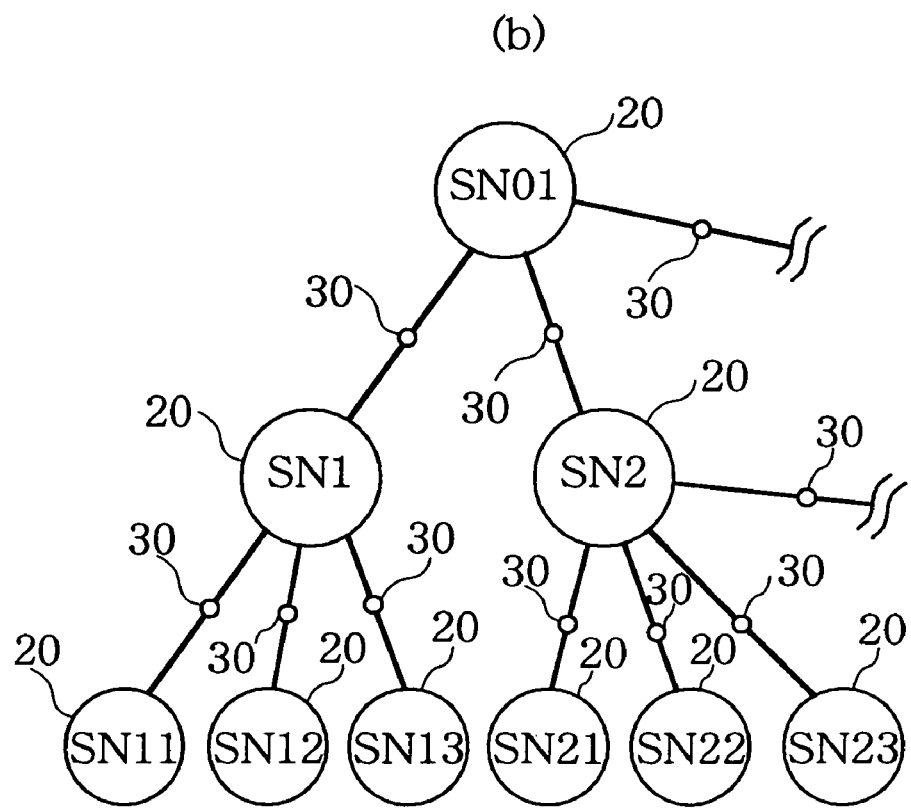
(b)

| Refrigerator | ※Cooling | ※Dehumidification | ※ Electric Power ※ Consumption | Transmission Address |
|---|---|---|---|---|
| | High,Average or Stop | On or Off | KW | --- |
| Air Conditioner | ※ Cooling | ※Dehumidification | ※ ※ Heating | Transmission Address |
| | High,Average or Stop | On or Off | High,Average or Stop | --- |
| ⋮ | ⋮ | ⋮ | | |
| Ventilation Fan | ※Operation | ※ Electric Power Consumption | --- | |
| | High,Average,low or Stop | KW | --- | |

(2)

| Refrigerator | |
|---|---|
| Air Conditioner | Thermal sensor,Illuminator, Lock of Door --- |
| Ventilation Fan | Cooking Stove,Microwave Oven,Thermal sensor,Gas Sensor --- |
| ⋮ | ⋮ |
| Electric Power Meter | Refrigerator,Air Conditioner,Electric Kotatsu,Televisor --- |

CONTROL NETWORK SYSTEM OF HOUSEHOLD ELECTRIC APPLIANCE

TECHNICAL FIELD

The present invention relates to control network systems of household electric appliances. More particularly, the invention relates to exchanges of operation data between household electric appliances provided in home networks and the most appropriate operations in accordance with the data.

BACKGROUND OF THE INVENTION (General Background Arts of the Present Invention)

In recent years various appliances have been used in houses, buildings, and floors and sections thereof. Accordingly, attempts to acquire more comfortable life, improve operating conditions, save more energy and make operations more efficient have been made by integratedly controlling the appliances under home networks (or home network systems).

Specifically, for example, air conditioners, refrigerators, fans, solar heaters for bathwater, microwave ovens, hot-water supplies, electric kotatsu, warm air circulators, electric clocks, televisors, illuminators or the like are used in houses. Since time and period when these appliances are used relate greatly therebetween, operation and standby thereof are properly controlled in consideration of conditions such as the time and the period so that more comfortable life, a saving of more energy and the like are intended.

More specifically, the attempts are as follows:
1) Solar heaters can be frequently used for bathwater in the summer season. Thermostat of hot-water supplies, therefore, does not have to be set to so high temperature in a time slot for bathing so that the bathwater should be set to lower temperature than the winter season.
2) Power level of air conditioners is reduced even in the summer season for an extremely short time for using microwave ovens. Consequently, electric power simultaneously consumed in the whole house can be decreased.
3) Power level and switching of air conditioners in rooms are controlled by detecting the presence of persons therein with sensors.
4) Power level of air conditioners in offices is controlled by sensing the operating conditions of appliances as heating sources in operation therein.
5) Unnecessary illuminators in rooms are switched off in accordance with the time of day and the positions of appliances in operation therein.
6) Illuminators and air conditioners in empty classrooms are switched off at universities.

In addition, it has been studied and attempted that not merely the switching of appliances is controlled in accordance with seasons and the time of day but also aged people and infants are cared for and watched over particularly in houses where only aged people live or their parents are frequently absent by detecting the operating conditions.

Examples are as follows:
1) Domestic helpers are informed of disorders through telephone lines when the following disorders are detected; a door of toilets is not opened and shut for more than a certain time, a volume of televisors is too high, the operations of various appliances are unnatural such that air conditioners and warm air circulators are simultaneously in operation, or the like.
2) Parents are warned by the screen and voice of televisors when a portable telephone of their children go out of an area supervised by a station in charge of the neighborhood of their house.

Connections between various appliances for the above-mentioned purposes are conceptionally shown in FIG. 1.

In FIG. 1, a refrigerator 1, an air conditioner 2, an electric kotatsu 3, a fluorescent light 4, a microwave oven 5 and a washing machine 6 are connected to a controller (or a CPU) 10 by an electric wire 11, and thus a (sub) network is configured. A televisor 7 and an electric clock 8 are connected to the controller 10 by an infrared ray 12, and thus a (sub) network is configured. A telephone 9 is connected to the controller 10 by a wireless 13, and thus a (sub) network is configured.

In addition to the above, other means such as supersonic waves or plural means are used for connecting the appliances.

Also regarding the network, as shown in FIG. 1, many appliances and (sub) networks are connected radially from the only controller 10, and additionally as shown in FIG. 2(a), in order to decrease the maximum electric power consumption in factories and buildings, several (sub) networks having a router {which is positioned between plural (sub) networks to realize mutual communication therebetween. In FIG. 1, the controller 10 serves for the router. A communication processing function attached to an appliance serves for the router depending on a system and the appliance.} are connected by the router or an appliance serving for the router as a terminal of components thereof. Furthermore, as shown in FIG. 2(b), appliances and (sub) networks are hierarchically connected as trees.

In FIGS. 2(a) and (b), 20 indicates a (sub) network or an appliance as a substantial (sub) network and 30 indicates a router or an appliance serving for the router.

Full-time custodians as well as information desks and doorbells are occasionally incorporated into a system in factories, office buildings and hospitals.

Another example is not so complicated but a simple constitution; in the case of connecting a televisor and a video tape recorder, the video tape recorder periodically reads out a time signal in airwaves, which the televisor received, to adjust its built-in clock thereby for the purpose of displaying an exact time.

Moreover, various kinds of standards and plans therefor (such as ET-2101 and JEM-1439) have been decided and proposed in the Electronic Industries Association of Japan, the Japan Electrical Manufacturers' Association and the like in order to effectively perform the functions of the networks.

Also, communications protocols and the like have been decided or developed.

For that purpose, equipments and functions such as communication processing functions necessary for performing the appropriate functions of the home networks have been attached to appliances (including sensors) in the stage of manufacturing or studied for attaching.

(Background Arts in View of the Problems to be Solved by the Present Invention)

In the above-mentioned configuration of control network systems of appliances, particularly household electric appliances, however, it should be recognized beforehand in the stage of designing the systems that which of the following methods the controller employs for acquiring operation data for controlling the appliances; a method of receiving the operation data transmitted from each of the appliances in changing the operation data such as switching, a method of receiving the operation data by a query from the controller to the appliances, a method of receiving the operation data periodically transmitted from the appliances to the controller, a method of receiving the operation data broadcasted from each of the appliances in changing the operation data, and the like. In terms of the conditions of the household electric appliances, the need to change how the controller acquires the operation data is occasionally caused on each introduction of other household electric appliances.

For the purpose of linked operations only by household electric appliances, addresses of household electric appliances for receiving operation data should be set at household electric appliances for transmitting the operation data, and additionally addresses of the household electric appliances for transmitting the operation data should be set at the household electric appliances for receiving the operation data. The setting, therefore, should be performed in each of control network systems of household electric appliances.

On the other hand, the problem is occasionally the electric power consumption of a controller in a system such that the controller receives operation data of household electric appliances to generate a command of operating other household electric appliances in accordance with the received operation data, and thereafter the controller transmits the command to other household electric appliances to control linkedly. That is, the electric power consumption of the household electric appliances is approximately 0.5 W on standby, while the electric power consumption of a personal computer as the controller is several tens to 100 W. Furthermore, in many cases the controller is constantly operated because of watching data in a network, leading to more electric power consumption thereof.

Available network wires, means and costs are limited in control network systems of household electric appliances.

Accordingly, it has been desirable that a technology without the need to change how a controller acquires operation data on each introduction of other household electric appliances is developed subject to many limitations in control network systems of household electric appliances.

Regarding linked operations between household electric appliances, it has been desirable that a technology of facilitating the setting of addresses and offering less electric power consumption is developed.

Also, it has been desirable that a technology of linkedly controlling household electric appliances without a controller with a considerable electric power consumption is developed.

DISCLOSURE OF THE INVENTION

The present invention is intended for solving the above-mentioned problems.

The following are noted:
Communication definition objects are decided in communications middlewares for connecting applications softwares and sub communications softwares, and thus appliances can be linkedly operated and controlled;
Appliances need specific kinds of other appliances and their operation data for effective operations thereof;
Many appliances already have a function of outputting operating conditions thereof to units at present;
Appliances need kinds and the contents of operation data of other appliances for effective operations thereof;
Specific amounts and kinds of household electric appliances are actually used in houses, and additionally the contents of effective operation and control thereof are simple;
Operators use remote controllers of household electric appliances, while the remote controllers operate specific kinds of the household electric appliances and remote controllers have been common to household electric appliances; and
The contents of operations of household electric appliances related with each other are simple and not complicated.

The present aspect of the invention is embodied below.

An aspect of the invention is characterized in that a network is provided with a controller; the controller acquires operation data (including a measurement by a sensor such as an electric current and a result of processing the measurement) of an appliance (including the sensor and an integral-type appliance of a televisor and a video tape recorder) to be linkedly operated and controlled thereby, and the controller transmits the operation data to another appliance; therefore the appliance maintains in advance information, communications protocols, data or equipments of transmitting conditions such that when and where data such as switching, a change in operation mode and an introduction thereof to the network are transmitted or not, and the appliance transmits necessary operation data to the controller in accordance with the information, communications protocols, data or equipments after adjusting with the controller; the controller, meanwhile, controls the information of transmitting conditions of the appliance, and additionally the controller receives necessary operation data after adjusting with the appliance to transmit the operation data or a direction to another appliance, and furthermore, depending on the situation, the controller provides the appliance with a new setting such that which operation data should be transmitted at what time and a setting such that unnecessary operation data should not be transmitted; and the appliance can accept the setting.

The above-mentioned configuration enables that the appliances are linkedly operated and the whole network system is effectively operated.

Another aspect of the invention is characterized in that a network is not provided with a controller; an appliance utilizing operation data of another appliance related therewith has a means of linkedly controlling for operating in accordance with kinds of the related appliance after acquiring the operation data thereof; the appliance exchanges necessary information of transmitting conditions before transmitting and receiving the operation data of the related appliance for the purpose of its appropriate operations; and consequently the appliance acquires the necessary operation data of the related appliance depending on the situation, leading to linked control and operation.

A further aspect of the invention is characterized by comprising a device for setting linked operations in installing an appliance control network system and introducing another appliance thereto; and in that the device sets the function of linkedly operating at an appliance.

Other aspects of the invention are characterized in that an appliance for outputting data is a sensor for detecting the presence of persons by voice, motion, infrared ray and the like; and an appliance utilizing the data is an air conditioner. Needless to say, the appliance may be an illuminator, a ventilation fan or the like.

Other aspects of the invention are characterized in that an appliance for outputting data is an electric power sensor such as an electric current meter; and an appliance utilizing the data is an air conditioner with a large electric power consumption.

A still further aspect of the invention is characterized in that a controller watches electric power consumption and electric current consumption of an appliance connected to an appliance control network system; and the controller controls the electric power consumption and the electric current consumption less than a predetermined value. Specifically, before the electric power consumption and the electric current consumption surpass the predetermined value, a load of an appliance with less necessity should be reduced and an appliance should be switched off and also a user should be informed of a predetermined warning.

A still further aspect of the invention is characterized in that a device for setting linked operations, not a controller, controls total electric power consumption of appliances (including NFB and a safety device serving therefor) less than a predetermined value.

Other aspects of the invention are characterized in that an appliance and a controller common to appliances are provided with a controller or a means of linkedly controlling in an appliance control network system. Accordingly, the following disorders due to operations by a user can be effectively prevented from being caused; total electric power consumption of appliances surpasses a predetermined value, an air conditioner and a warm air circulator are simultaneously in operation, or the like. In the case of a controller common to appliances, several measures for the disorders can be displayed on a display unit thereof, and thereafter the user can choose from the measures.

BRIEF DESCRIPTION OF THE DRAWINGS

FIG. 2 is a view showing another configuration of a home network system of conventional household electric appliances.

FIG. 8 is a view showing information to be transmitted from household electric appliances stored in ROM of the above-mentioned controller and data of other household electric appliances serving for appropriate operations thereof.

REFERENCE CHARACTERS

Figure 1:
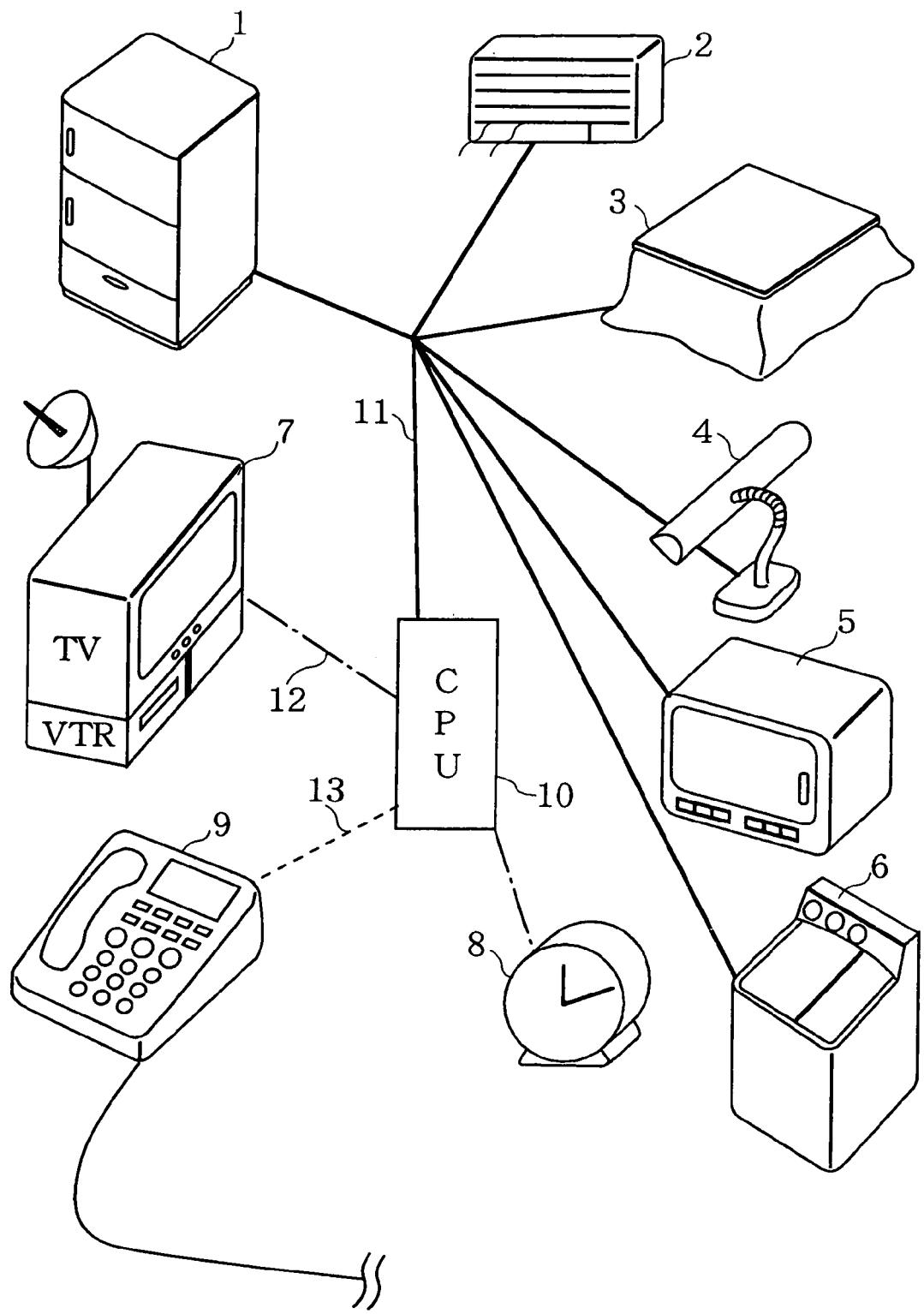
FIG. 1 is a view showing a configuration of a home network system of conventional household electric appliances.

1 a refrigerator
2 an air conditioner
3 an electric kotatsu
4 a fluorescent light
5 a microwave oven
6 a washing machine
7 a televisor and a video tape recorder
8 an electric clock
9 a telephone
10 a controller
11 an electric wire
12 an infrared ray
13 a wireless
20 a sub network
30 a router
40 a device for setting linked operations
100 a controller
101 a means of controlling communications
102 a means of controlling information of transmitting condition
103 a means of acquiring operation data
110 a network line
111 a CPU
112 a UI
113 a ROM
114 a RAM
300 a household electric appliance
301 a means of controlling communications
302 a means of maintaining information of transmitting condition
303 a means of controlling transmission of operation data
304 a means of controlling information of transmitting condition
305 a means of controlling operation data
310 a sensor for the presence of persons
311 a means of setting information of transmitting condition
321 a means of transmitting demand data for setting information of transmitting condition
322 a means of setting reception of operation data
323 a means of controlling linked operations
330 a household electric appliance
401 a means of controlling communications
402 a means of transmitting demand data for setting information of transmitting condition
403 a means of transmitting demand data for setting reception of operation data

DETAILED DESCRIPTION OF THE PREFERRED EMBODIMENTS

The present invention is described below based on preferred embodiments.

Embodiment 1

Embodiment 1 employs a controller for linkedly operating an appliance.

A configuration of hardwares and softwares in an appliance, which is presuppositional for actually performing Embodiment 1, is described (linked operations in a home network in other Embodiments are basically the same as Embodiment 1.).

First, it is described by an example whether to execute linked operations in a home network of household electric appliances.

In order to print with a special font by a printer connected to a computer, the printer decides whether a command of printing with a special font is input from a user in advance of printing. If the command is input, the printer decides whether necessary data for printing with a special font are stored in a predetermined memory. If the data are stored, the printing is executed by reading in the data. If the data are not stored, then a warning is displayed on a display unit to halt the printing. Alternatively, if the command is not input, necessary data for printing with an ordinary font are read out from a memory to execute the printing.

The execution of linked operations in a home network of household electric appliances is basically the same as the above. That is, when a household electric appliance is provided for a home and started, a predetermined access to other household electric appliances is executed through an electric wire in accordance with a user's direction for linked operations and an internal program, and thereafter the household electric appliance decides by a response thereto whether other household electric appliances are linkedly operated, resulting in individual operations or linked operations.

Next, the contents of a demand for setting information of transmitting conditions, a setting of reception and transmission of operation data and reception of both are described as a part of linked operations by an example.

Nowadays, many appliances have a function of informing or enabling to inform or direct a user of operating conditions thereof for the purpose of user's convenience of controlling. The examples are as follows; a periodic printout of transmit-receive records in a facsimile, a display of temperature to be set in an air conditioner, and besides household electric appliances a display of mileage, fuel and lubricating oil in a car.

Moreover, appliances display to a user operating conditions or functions to be performed so that the user chooses which function is performed. For example, many video tape recorders light a recording lamp and display on a display screen of a televisor a standard-speed recording, a 3-speed recording or a commercial-skip recording to be chosen by the user with a remote controller. Air conditioners display on a remote controller a choice between cooling and heating, a setting of temperature, operating time and the like, leading to the performance of user's desirable function.

In Embodiment 1, household electric appliances basically utilize the functions so that a switching and a choice of operating mode are executed by a user. In the case of linked operations, however, the switching and the choice of operating mode are executed by a controller, not the user. Needless to say, the contents of data and the frequency of exchanges thereof vary with the situation.

Next, transmission and reception of necessary data for linked operations are described by an example.

An appliance periodically stores a predetermined operation data or updates the data on every change in operating conditions, and additionally the data can be output by a user. This is such that the conditions of units are displayed in a central control room, a driver's seat and the like in plants for vessels and aircrafts; and flight conditions are constantly recorded at a flight recorder in aircrafts.

The examples are as follows: a display of the number of times documents are corrected in using a word processor; a display of the number of copying papers in a copying machine; a small display of switch-on in a televisor; a display of a channel on which another program than a currently watched program is on record in a video tape recorder; a display of current conditions in an electric rice cooker; and the like.

Furthermore, a household electric appliance mutually adjusts the performance of its function in conformity with communications protocols. Specifically, facsimiles mutually contact on color printing, paper size and a transmission in a detail mode in conformity with the Protocol CCITT T30 by Comite consultatif international telegraphique et telehonique, and after such contact, a transmitting facsimile generally processes image data for adjusting to both of the transmitting and receiving facsimiles, transmission and reception are executed between the facsimiles. Video tape recorders read out a time signal in airwaves received by a televisor connected thereto to display an exact time to a user and utilize for reserved recording.

An appliance specifies kinds and the contents of data of other appliances whose data are necessary therefor. For example, operating conditions of air conditioners and refrigerators are generally unnecessary for video tape recorders, particularly, reserved recording. Accordingly, when the household electric appliance demands operating conditions from other household electric appliances or set information of transmitting conditions, a program operates such that the appliance demands necessary data from only other necessary appliances and only the data are transmitted and received is installed in advance or can be externally set (the program is technologically installed in applications softwares and communications middlewares. Protocols and programs, therefore, have been standardized.).

Consequently, the above-mentioned functions of household electric appliances are utilized for a home network system of the present invention. In other words, household electric appliances can be incorporated into a home network system by applying the functions.

Figure 3:
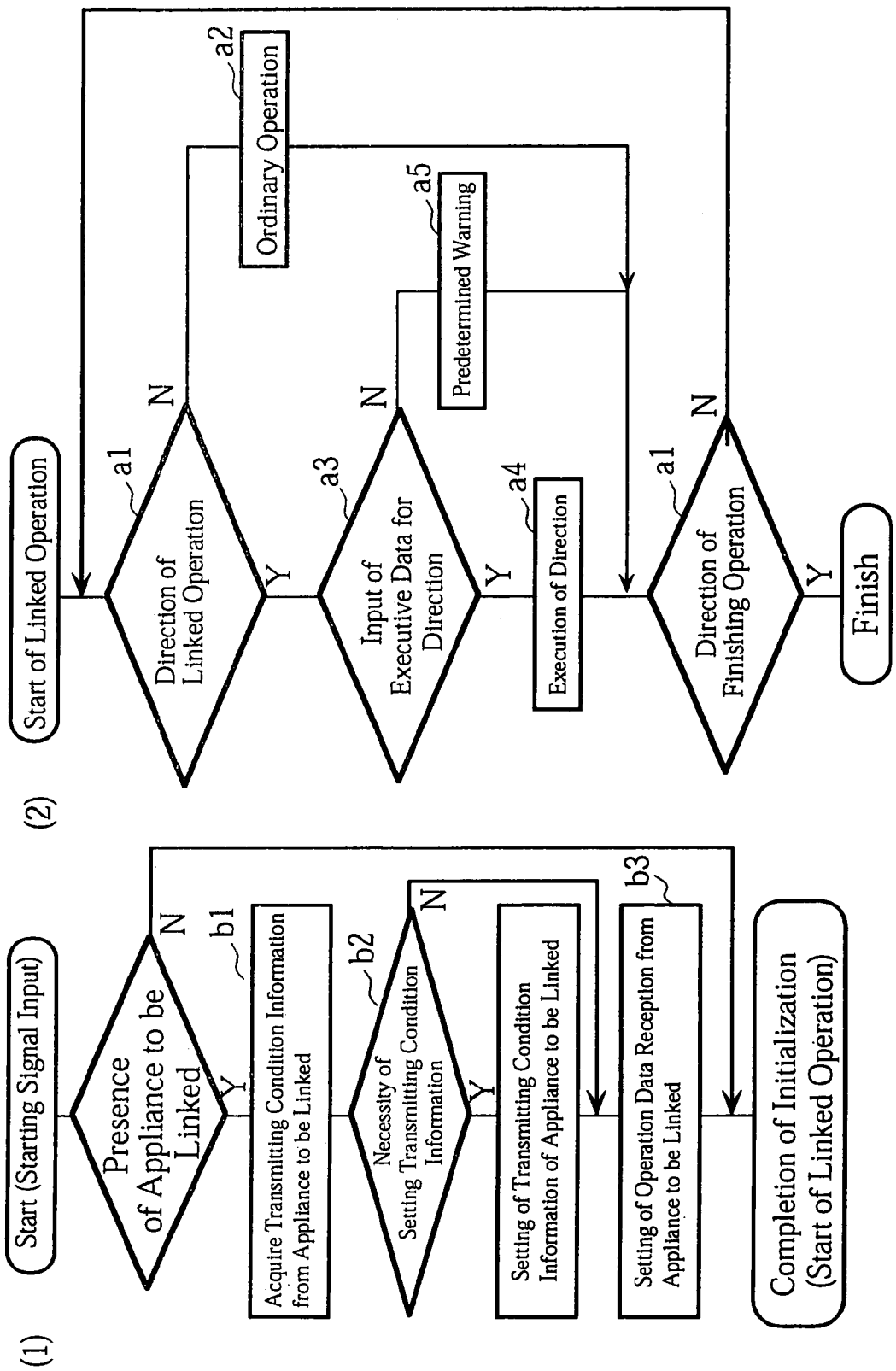
FIG. 3 is a flow chart showing basic procedures for linked operations between appliances in embodiments of the present invention.

Based on the above, although the above-mentioned description is partially repeated, the execution of linked operations of household electric appliances in a home network system of Embodiment 1 and a basic decision on the processing of transmitting and receiving necessary data for the execution are described in accordance with an understandable example referring to a flow chart shown in FIG. 3.

Regarding the execution of linked operations, if household electric appliances are not connected to a home network or do not have other household electric appliances to be linked thereto even in connection with a home network, linked operations are not set and household electric appliances are individually operated. Taking air conditioners for example, if an air conditioner is not connected to a home network or even in connection with a home network, wherein the other household electric appliances are appliances such as a facsimile and a video tape recorder which are not related with the operations thereof, the air conditioner is individually operated regardless of the home network. Then, a user of the air conditioner controls switching and power level thereof, or the air conditioner is controlled under a program set by the user in its built-in timer.

That is, the steps of a1 and a2 in FIG. 3 (2) are executed.

On the other hand, the steps of b1, b2 and b3 in FIG. 3 (1) are executed in the presence of household electric appliances to be linked in a home network. First, a household electric appliance transmits a demand for querying to other household electric appliances in a home network whether to be linked thereto. On a response from any household electric appliances to be linked, the household electric appliance decides that the household electric appliances should be linked and executes the step of b1. That is, the household electric appliance transmits a demand for querying information of transmitting conditions of operation data of the household electric appliances to be linked, and the household electric appliance acquires the information of transmitting conditions in response thereto. Taking the above-mentioned air conditioners for example, when an illuminator is a household electric appliance to be linked in a home network, an air conditioner receives a response from the illuminator and acquires its transmittable operating conditions (lighting conditions and illuminance) and transmitting conditions (periodically or on every change in operating conditions; broadcasting, transmitting to a specific address or transmitting in response to a query).

Next, when the information of transmitting conditions acquired from the household electric appliances to be linked does not include the transmission of necessary operation data for linked operations to the household electric appliance, or when the transmission of necessary operation data for linked operations is not set, the household electric appliance decides that the information of transmitting conditions of the household electric appliances to be linked should be set and executes the step of b2. That is, the household electric appliance transmits a demand for setting the information of transmitting conditions to the household electric appliances to be linked, and consequently the information of transmitting conditions is set so that operation data of the household electric appliances to be linked are transmitted to the household electric appliance. Subsequently, the step of b3 is executed to complete an initialization of linked operations. That is, the household electric appliance receives operation data transmitted from the household electric appliances to be linked or receives the operation data by a query, and thereafter the household electric appliance sets a storage of the operation data in a memory therefor, resulting in a completion of an initialization of linked operations. Taking illuminators for an example of household electric appliances to be linked to the above-mentioned air conditioners, when an illuminator transmits lighting conditions as operation data not on every change in operating conditions but in response to a query, the household electric appliance transmits to the illuminator a demand for setting information of transmitting conditions such that the illuminator broadcasts or transmits thereto lighting conditions on every change in operating conditions, thereby leading to a setting of information of transmitting conditions. Subsequently, the household electric appliance receives lighting conditions transmitted from the illuminator on every change in operating conditions, and sets a storage thereof in a memory for controlling linkedly to the received lighting conditions, resulting in a completion of an initialization of linked operations.

In addition, after completing the initialization of linked operations, the steps of a3 and a4, exceptionally a5, in FIG. 3 (2) are executed in the case of operating linkedly to a home network. That is, directions of linked operations in FIG. 3 are provided by a user of household electric appliances in a home network, depending on a controller and household electric appliances.

The above-mentioned case is such that air conditioners are operated linkedly to illuminators and door locks; however, linked operations of more household electric appliances are actually executed in a home network. Kinds of identifier codes, therefore, are standardized in advance so that household electric appliances can be incorporated into a home network system. A program is installed in household electric appliances such that sub identifier codes are automatically provided in the presence of plural household electric appliances having the same kinds of identifier codes, leading to a prevention of data interference by transmitting and receiving data provided with the sub identifier codes.

In condominiums, an interference of a home network system can be caused in neighboring sections (rooms). The measures, therefore, are adopted such that an electric wire is provided with a blocking filter, data are transmitted and received with the provision of different house codes in each section, or the like. Since the measures are publicly known arts, their descriptions are omitted.

Based on the above, a home network system of Embodiment 1 is described.

Figure 4:
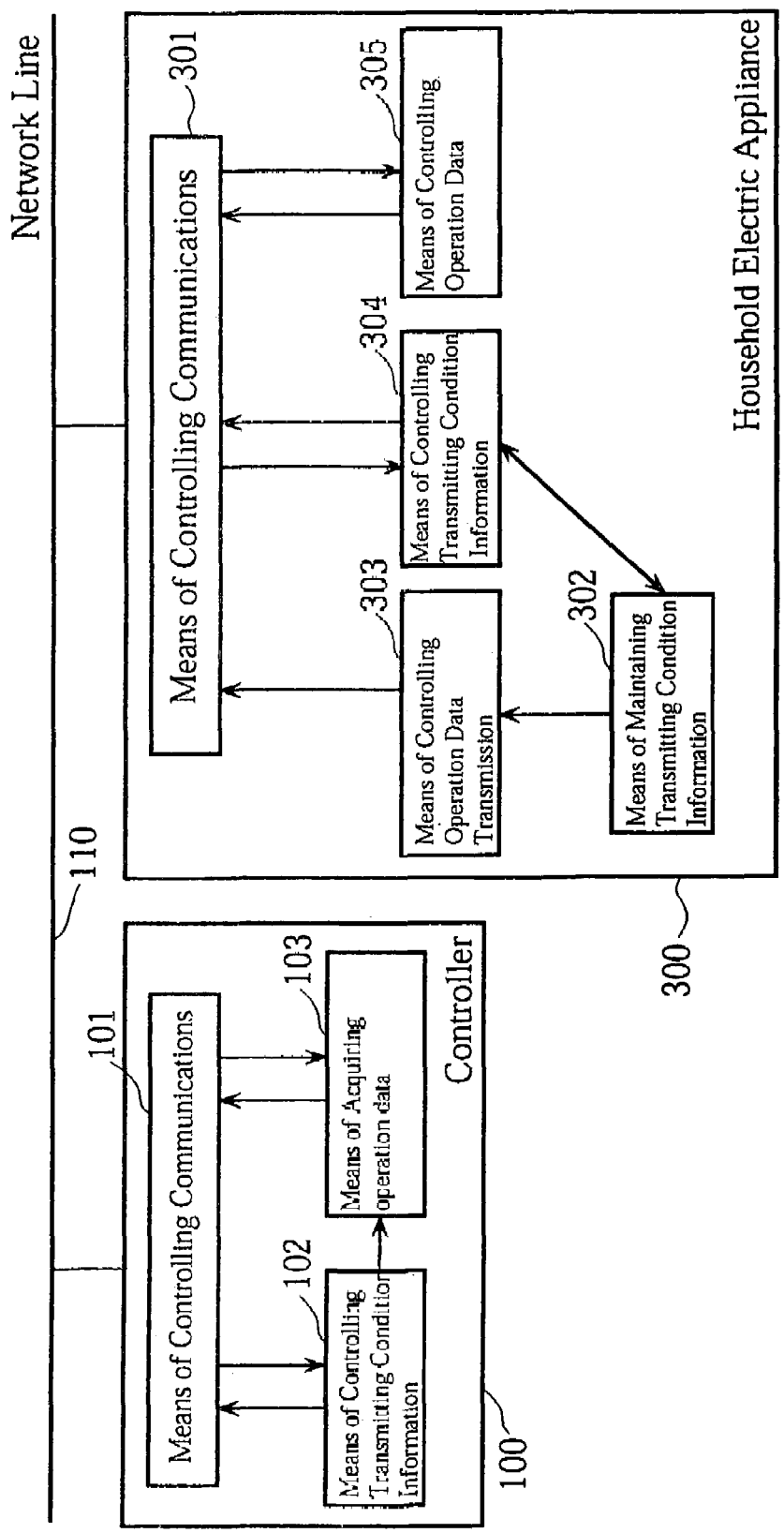
FIG. 4 is a view showing a constitution of Embodiment 1 of the present invention.

FIG. 4 shows a principal configuration of a home network system of Embodiment 1.

In FIG. 4, 100 is a controller, 101 is a means of controlling communications, 102 is a means of controlling information of transmitting conditions and 103 is a means of acquiring operation data.

300 is a household electric appliance to be linkedly operated under a controller, 301 is a means of controlling communications, 302 is a means of maintaining information of transmitting conditions, 303 is a means of controlling transmission of operation data, 304 is a means of controlling information of transmitting conditions and 305 is a means of controlling operation data.

110 is a network line utilizing an electric wire.

The means of controlling communications 101 and 301 of the controller and the household electric appliance respectively control exchanges of necessary information with each other and, depending on the situation, other household electric appliances and sensors (both are not shown in FIG. 4) by using the network line 110. Specifically, a generation of data to be transmitted, a transmission of telegraphic messages, a reception of telegraphic messages, an extraction of data to be received and the like.

Figure 5:
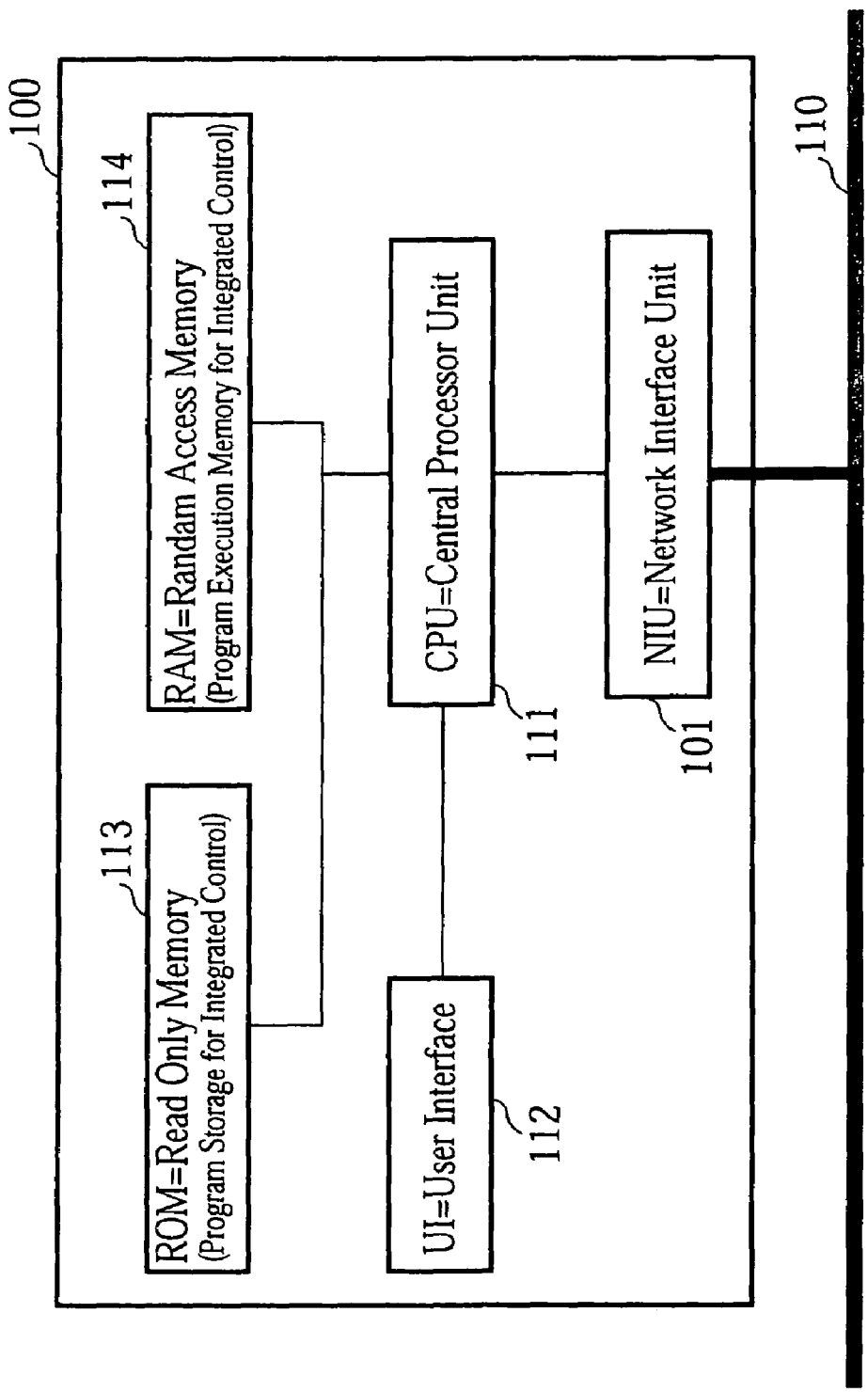
FIG. 5 is a view showing a configuration of a controller in Embodiment 1 of the present invention.
Figure 6:
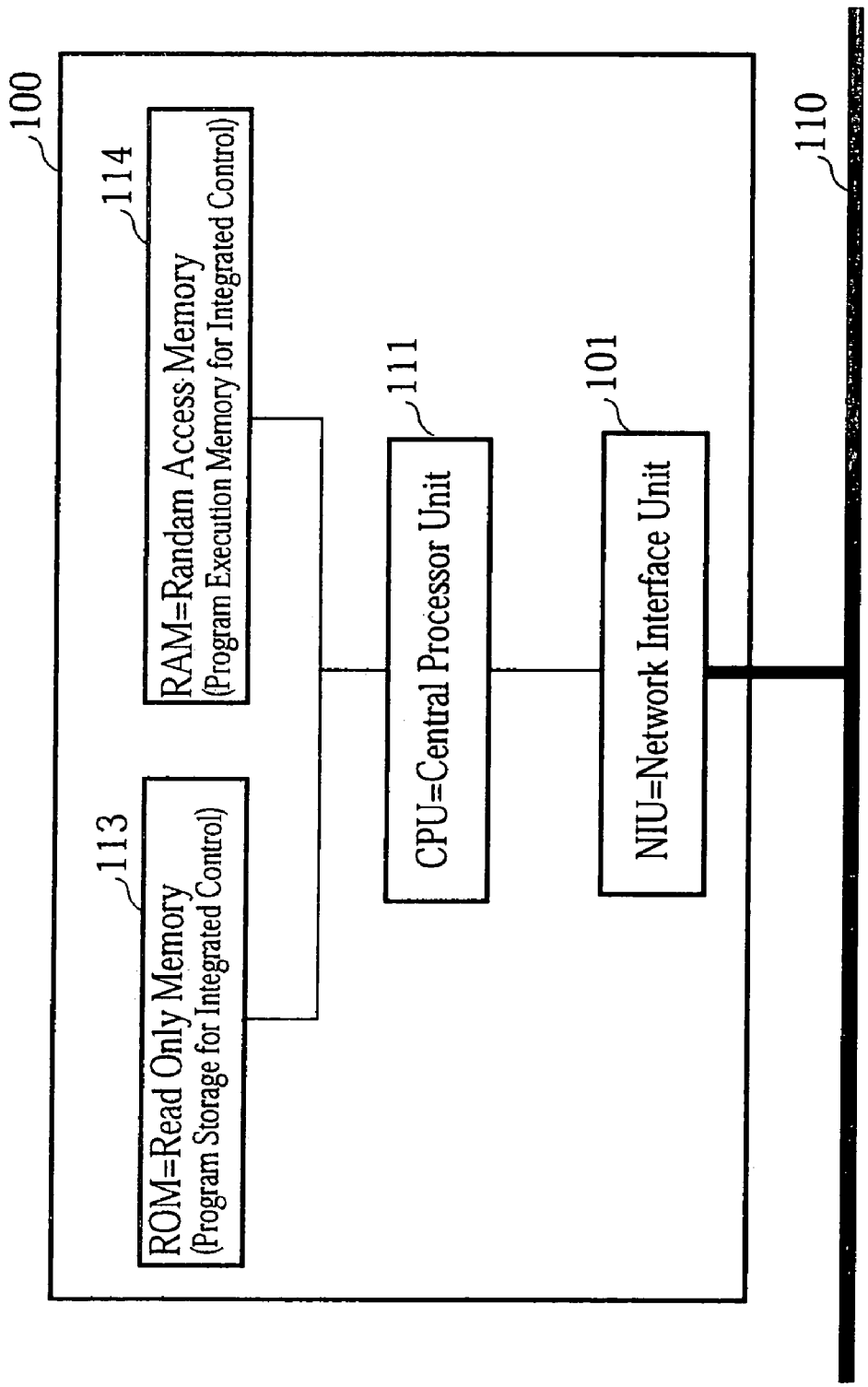
FIG. 6 is a view showing another configuration of a controller in Embodiment 1 of the present invention.
Figure 7:
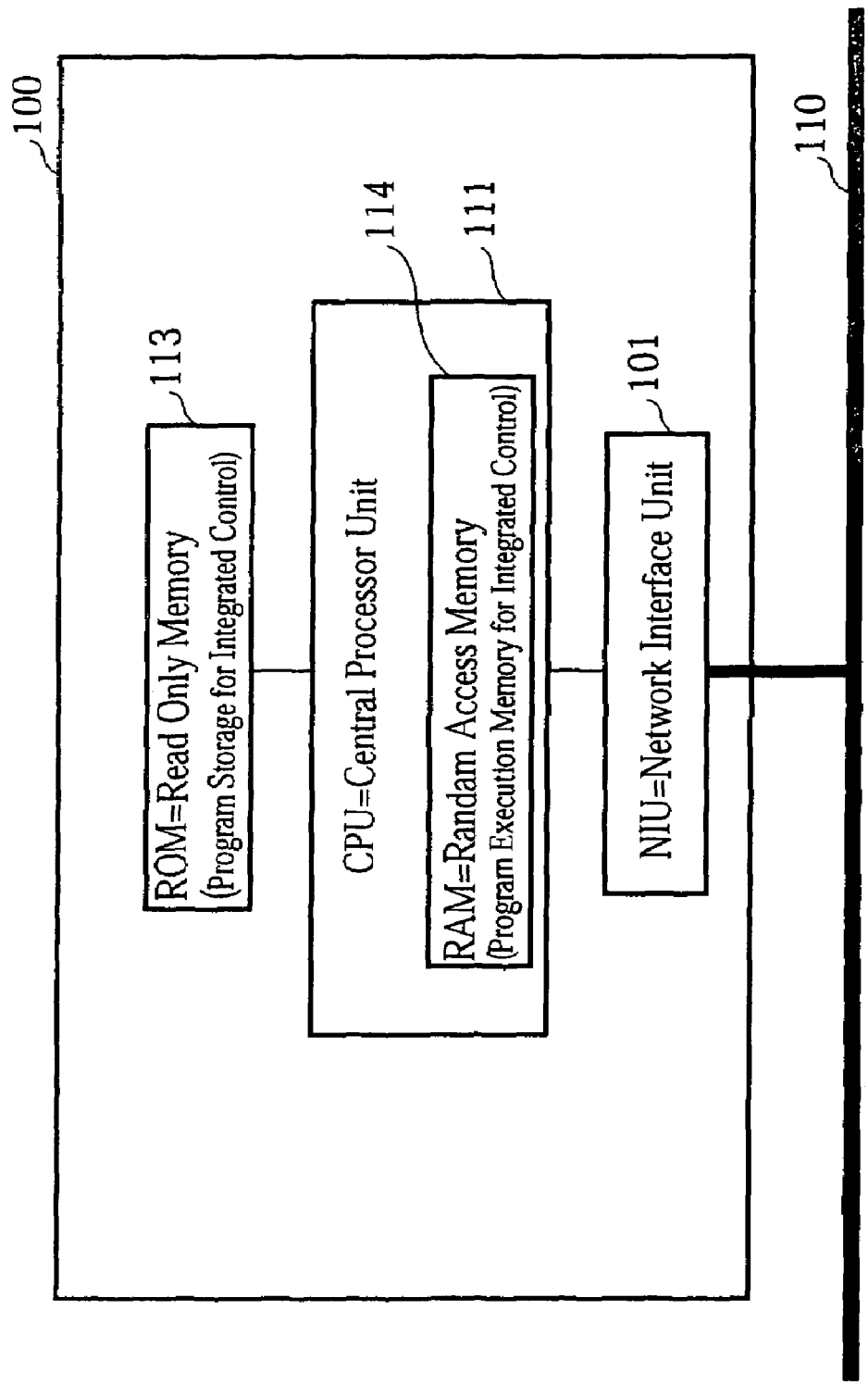
FIG. 7 is a view showing a further configuration of a controller in Embodiment 1 of the present invention.

FIGS. 5 to 7 specifically show types of configuration of the controller. In FIGS. 5 to 7, 101 is a network interface unit equivalent to the means of controlling communications 101 shown in FIG. 4. 111 is a central process unit (CPU) configured by internal chips. 112 is an input-output (control) unit comprising a user interface (UI). 113 is a ROM programmed by a manufacturer for performing an appropriate function as the controller. 114 is a RAM in which necessary data are properly stored while performing a function as the controller. The CPU, UI, ROM and RAM serve for the means of controlling information of transmitting conditions 102 and the means of acquiring operation data 103 shown in FIG. 4. FIG. 6 shows a type of the controller which is not provided with the UI and FIG. 7 shows a type of the controller which is provided in the CPU with the RAM.

Each household electric appliance is provided with softwares and hardwares similar to the above, which have different memory capacity and CPU performance.

FIG. 8 shows a part of data stored in the ROM. FIG. 8 (1) depicts a table of information to be transmitted from each household electric appliance to a controller. The top row of FIG. 8 (1) indicates that a refrigerator should transmit high, average or stop of cooling, on or off of dehumidification and a value of electric power consumption. In the top row, a single asterisk in each item indicates that the refrigerator should transmit on every change in the above-mentioned operating conditions, and double asterisks indicate that the refrigerator should transmit on every change as well as periodically. FIG. 8 (2) indicates which household electric appliances are related with effective operations of each household electric appliance. For example, a refrigerator in the top row is operated regardless of other household electric appliances, while an electric power meter in the bottom row is related with household electric appliances having large electric power consumption.

Each household electric appliance has a function of meeting a demand of a controller. That is, on a demand of a controller for transmitting, the household electric appliance has a function of increasing data item to be transmitted. Another function is to transmit every other minute electric current consumption which is initially transmitted every ten minutes. For the purpose, necessary storage and adjustment can be executed in an internal memory. As a result of a demand of a controller for transmitting, a refrigerator transmits items in the top row of FIG. 8 (1) to the controller. The refrigerator may offer more function such as a transmission of inside temperature to be set; however a home network system of Embodiment 1 does not consider more function. A controller, therefore, does not demand more function and is not affected by a transmission of inside temperature to be set or the like.

Regarding a household electric appliance, the means of maintaining information of transmitting conditions 302 is a memory for maintaining the conditions of transmitting operation data, such as information and routine on when the operation data are transmitted, which operation data are transmitted and to which address the operation data are transmitted. The contents are described as the above-mentioned FIG. 8 (1).

The means of controlling transmission of operation data 303 transmits operation data (controlled thereby) through the means of controlling communications 301 in accordance with the information maintained by the means of maintaining information of transmitting conditions. Specifically, switching, a load of operations, a time signal in airwaves received by a radio, and the like are transmitted periodically or on every change in operating conditions.

The means of controlling operation data 305 stores operation data of a household electric appliance constantly or periodically.

The means of controlling information of transmitting conditions 304 informs the means of maintaining information of transmitting conditions 302 of the information of transmitting conditions transmitted from a controller, and updates the information maintained by the means of maintaining information of transmitting conditions depending on the situation. That is, the information should occasionally not be transmitted depending on kinds and the contents of household electric appliances connected to a home network.

Figure 9:
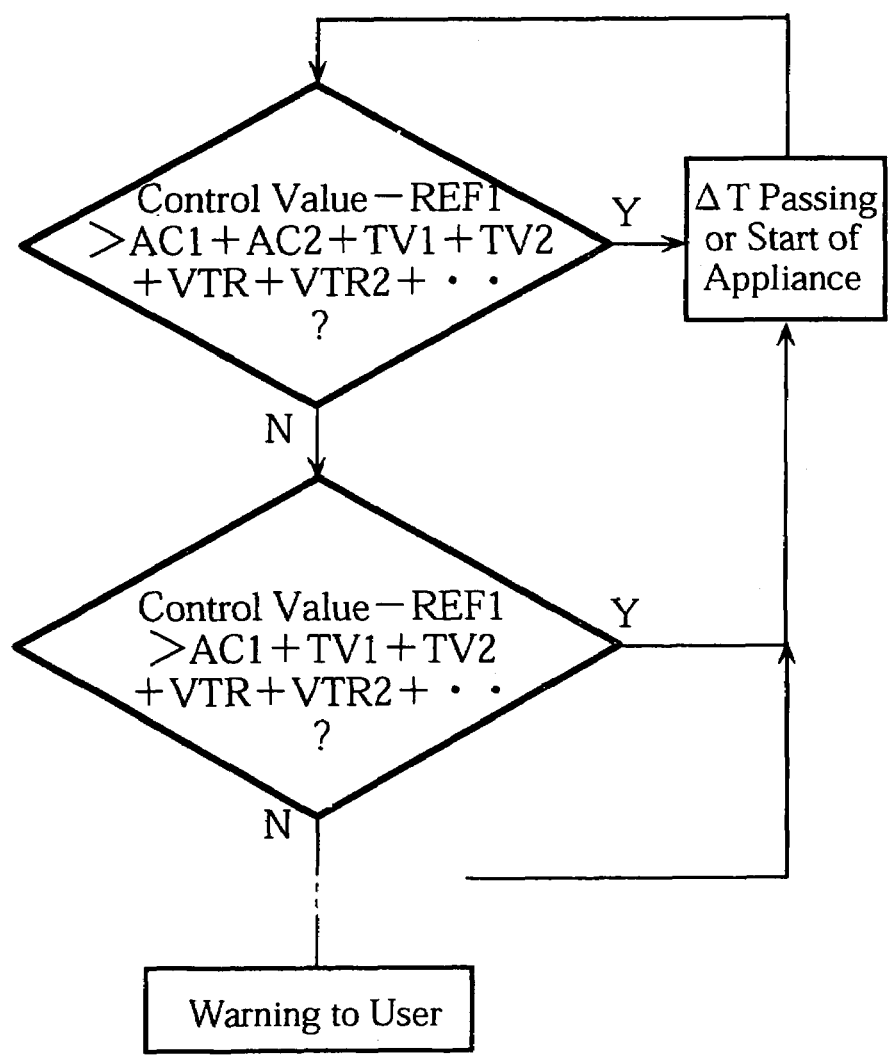
FIG. 9 is a view showing data of household electric appliances necessary for other household electric appliances stored in RAM of the above-mentioned controller and a flow chart showing program procedures for performing functions in accordance with the data.

Based on the above, a controller stores in a RAM the contents shown in FIGS. 8 (1) and (2) with regard to only household electric appliances currently connected to a home network system. Taking the items of an electric power meter shown in FIG. 8 (2) for example, the contents shown in FIG. 9 (1) are stored. This case is such that code 1 is provided for a refrigerator while codes 1 and 2 are provided for air conditioners, televisors and video tape recorders. Thus, in a home network system the electric power consumption of a household electric appliance is controlled less than a predetermined value by a program, referring to the data of an electric power meter stored in a RAM. Specifically, the refrigerator is kept switched on and one of the air conditioners or the televisors is switched off. The procedures are described in FIG. 9 (2).

Alternatively, a word processor in operation is kept switched on and the refrigerator capable of pausing is switched off, then the controller, the word processor and the televisor are informed that the refrigerator is switched off in consideration of total electric power consumption.

The means of controlling information of transmitting conditions 102 demands from the means of controlling information of transmitting conditions 304 of a household electric appliance the transmission of information of transmitting conditions such that when and which information is transmitted, and the information of transmitting conditions is received in response thereto. In addition, the means of controlling information of transmitting conditions demands the transmission of data such that which operating conditions can be transmitted and receives a response thereto. If the response includes the data of operating conditions, the data are transmitted to the means of acquiring operation data by the means of controlling information of transmitting conditions.

If the response of information of transmitting conditions from a household electric appliance does not include the data of operating conditions, the means of acquiring operation data demands the transmission thereof and receives.

Based on the above, the operations of household electric appliances are appropriately controlled in a home network system such that a controller is a center thereof.

Taking a user-friendly facsimile for example, a user is periodically informed by printing that facsimile number of transmitter and receiver, date and time of transmission and reception, the number of papers in transmission and reception, and how many more papers left. Also, a controller is similarly informed.

The controller, however, is informed not merely by printing but also through an electric wire. Depending on the direction of the controller, it can be informed only that date and time of transmission and reception, the number of papers in transmission and reception, and how many more papers left.

As a specific means therefor, the controller directs that a flag be provided for only an item to be informed by a home network among transmission items maintained by the means of maintaining information of transmitting conditions 302.

In a home network system shown in FIG. 1, a controller decides which operation data of a household electric appliance can be acquired, and thereafter necessary control is executed. Specifically, a controller causes a facsimile to ring a warning so as to inform a user of papers scarcely left.

When plural facsimiles are used in an office, each facsimile is provided with an identifier code (ID) by another means as described above and thereby it is decided which facsimile rings a warning.

In a home network system shown in FIG. 2(*a*), a control unit of a household electric appliance is properly controlled by a controller. For example, an exhaust fan informed of a lighting of a cooking stove is automatically switched on or leveled up in its power even in operation. For the purpose, a spark plug of a cooking stove detects a switch-on thereof by a user to instantaneously transmit a signal to the controller, which directs the exhaust fan to operate when out of operation or to level up its power to a maximum when in a low power or in an air-conditioned room.

Embodiment 2

In Embodiment 2, a household electric appliance, which utilizes operating conditions of other household electric appliances for controlling operations thereof, acquires the operating conditions from other household electric appliances to be linked.

Kinds of other household electric appliances whose operation data are necessary for a household electric appliance are specified. For example, indoor temperature and whether an air conditioner is in operation or not are important for a ventilation fan; and particularly the operations of a cooking stove is important for an exhaust fan above the cooking stove, while whether a televisor, a washing machine and an illuminator are in operation or not is not related with the operations thereof. An exhaust fan, therefore, acquires only operation data of necessary household electric appliances such as a cooking stove so as to link the operation data to the operations thereof.

By contrast, kinds of other household electric appliances, which utilize operation data of an air conditioner, are specified. That is, the operations of an air conditioner are substantially not related with the reception of a facsimile and the operations of hot-water supplies, and additionally simultaneous operation of an air conditioner and either of a warm air circulator and an electric heater means a disorder.

The equipment of a simple appliance such as a sensor with a timer leads to a raise in costs.

Accordingly, depending on the kind of another household electric appliance to be installed in a room, the household electric appliance can directly acquire only operation data of necessary household electric appliances not through a controller so as to link the operation data to the effective operations thereof. Embodiment 2 relates to such a case.

Figure 10:
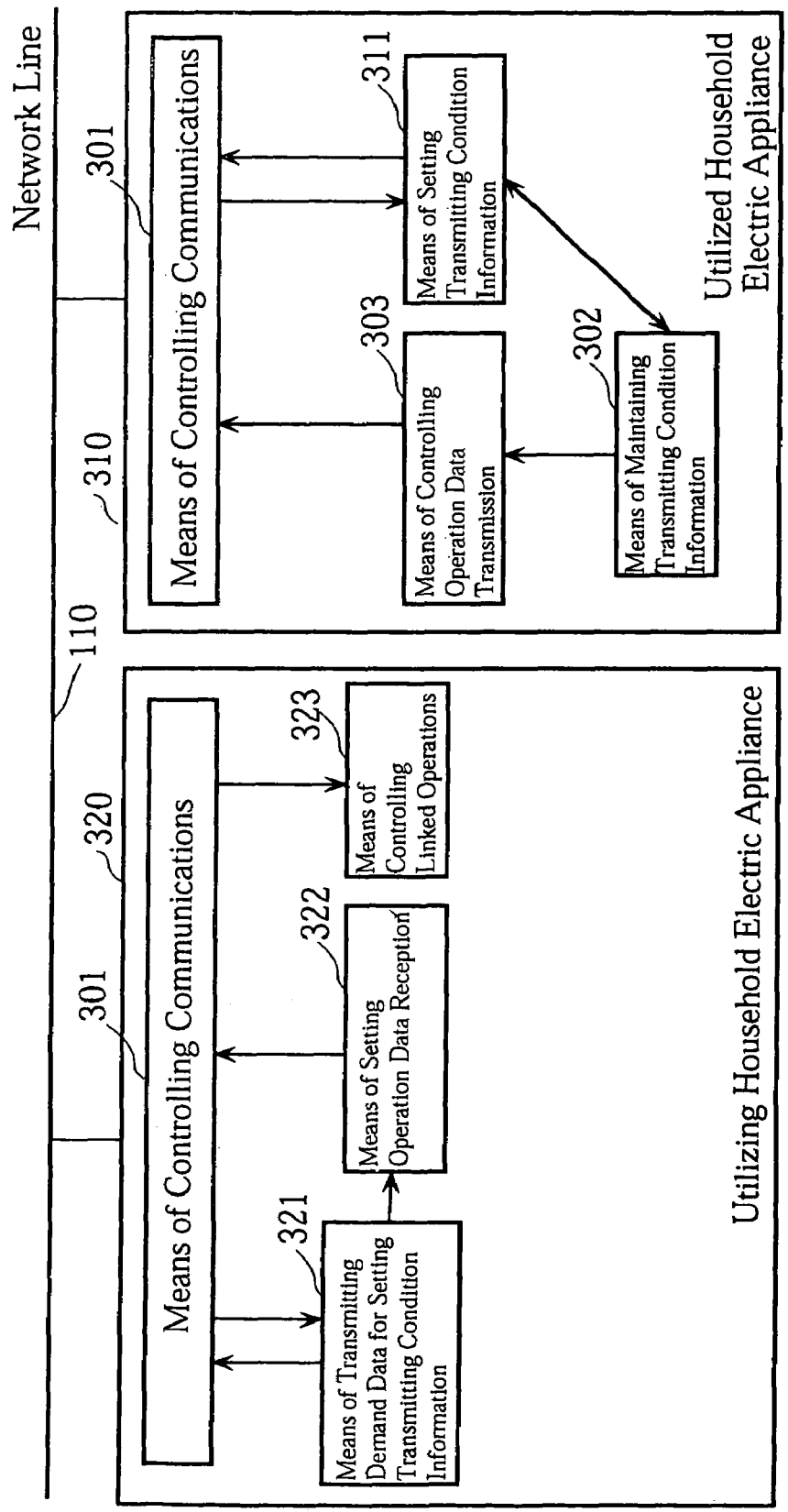
FIG. 10 is a view showing a constitution of Embodiment 2 of the present invention.

FIG. 10 shows a constitution of Embodiment 2.

In FIG. 10, 310 is a household electric appliance which outputs operation data thereof to be utilized for the operations of other household electric appliances. 301 is a means of controlling communications, 302 is a means of maintaining information of transmitting conditions, 303 is a means of controlling transmission of operation data and 311 is a means of setting information of transmitting conditions.

320 is a household electric appliance which acquires operation data of other household electric appliances so as to utilize the operation data for linked operations. 301 is a means of controlling communications, 321 is a means of transmitting demand data for setting information of transmitting conditions, 322 is a means of setting reception of operation data and 323 is a means of controlling linked operations.

The functions of the means of controlling communications 301, the means of maintaining information of transmitting conditions 302 and the means of controlling transmission of operation data in the utilized household electric appliance 310 are similar to those of Embodiment 1.

The means of setting information of transmitting conditions 311 sets in the means of maintaining information of transmitting conditions 302 the information of transmitting conditions transmitted from the utilizing household electric appliance 320 through the network line. For example, a cooking stove informs an exhaust fan thereabove of its operations and which power level of high, medium and low when in operation on every control by a user.

The means of transmitting demand data for setting information of transmitting conditions 321 in the utilizing household electric appliance demands that the utilized household electric appliance 301 set a predetermined information of transmitting conditions. Specifically, an air conditioner demands that a thermal sensor periodically transmit temperature information; an exhaust fan above a cooking stove demands that the cooking stove transmit the information of its operations and power level in operation, and an air conditioner transmit the information of its operations.

The means of setting reception of operation data 322 functions similarly to the means of acquiring operation data of Embodiment 1 and acquires operation data transmitted from the utilized household electric appliance periodically or on every change in operating conditions.

The means of controlling linked operations 323 controls operating conditions of an appliance provided therewith in accordance with the data acquired by the means of setting reception of operation data. Specifically, if a thermal sensor transmits the information of low temperature, an air conditioner reduces its power level.

An exhaust fan above a cooking stove is not merely automatically switched on when the cooking stove is lit, but also is leveled up in its power to a maximum so that the air heated by the cooking stove is prevented from diffusing into a room when an air conditioner is in operation, and additionally depending on the situation the exhaust fan considers indoor temperature and raises a volume of a televisor in operation.

Figure 11:
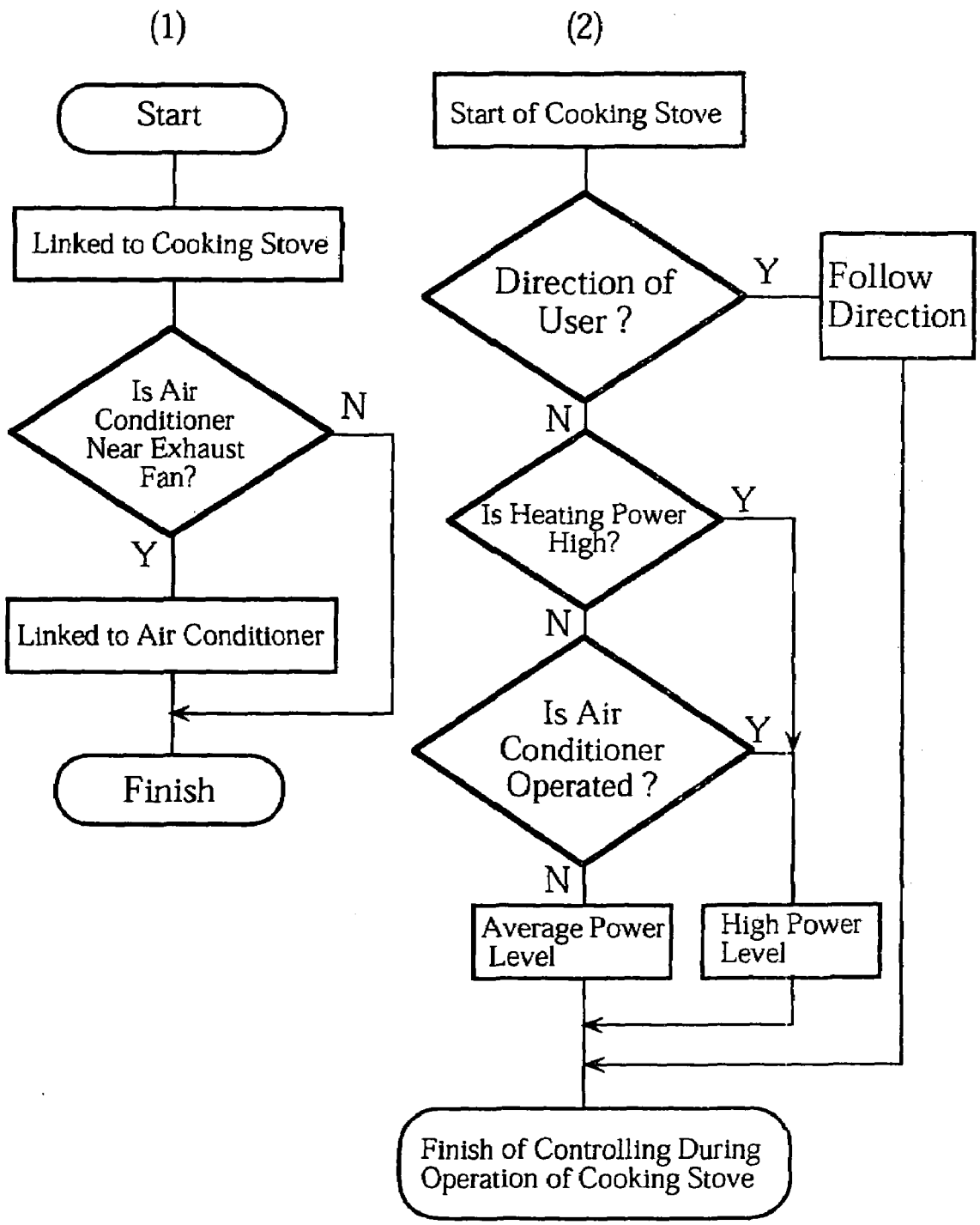
FIG. 11 is a flow chart showing procedures for setting and controlling linked operations of an exhaust fan to a cooking stove and an air conditioner in Embodiment 2 of the present invention.

FIG. 11 shows procedures for performing the functions of an exhaust fan.

In FIG. 11, (1) shows procedures for linked operations to a cooking stove and an air conditioner on an introduction of an exhaust fan to a home network system. (2) shows procedures for linked operations particularly to a cooking stove as a part of a home network system. In Embodiment 2, it is detected by the presence of an air conditioner within a direct reach of ultrasonic signals from an exhaust fan (the presence of its response thereto) whether the air conditioner exists near the exhaust fan.

In addition, similar functions are performed in linked operations of an audio appliance and an illuminator to a curtain and a window blind. That is, when an audio appliance is switched on at a higher volume than a predetermined volume or an illuminator is switched on, a curtain and a window blind are automatically shut unless a user transmits a direction. Moreover, when an air conditioner is in operation with a great difference between a temperature to be set and indoor temperature, a curtain and a window blind are automatically shut.

A storage heater for water by utilizing electric power at nighttime can be operated in a full power level after confirming that another appliance consuming great electric power such as a warm air circulator is out of operation at nighttime.

In Embodiment 2, whether a controller exists or not, a household electric appliance has the means of controlling linked operations, which is an added software, for controlling in accordance with the directions from a network, resulting in appropriate linked operations to another related household electric appliance without causing a raise in costs.

Embodiment 3

Embodiment 3 employs a device for setting linked operations.

Figure 12:
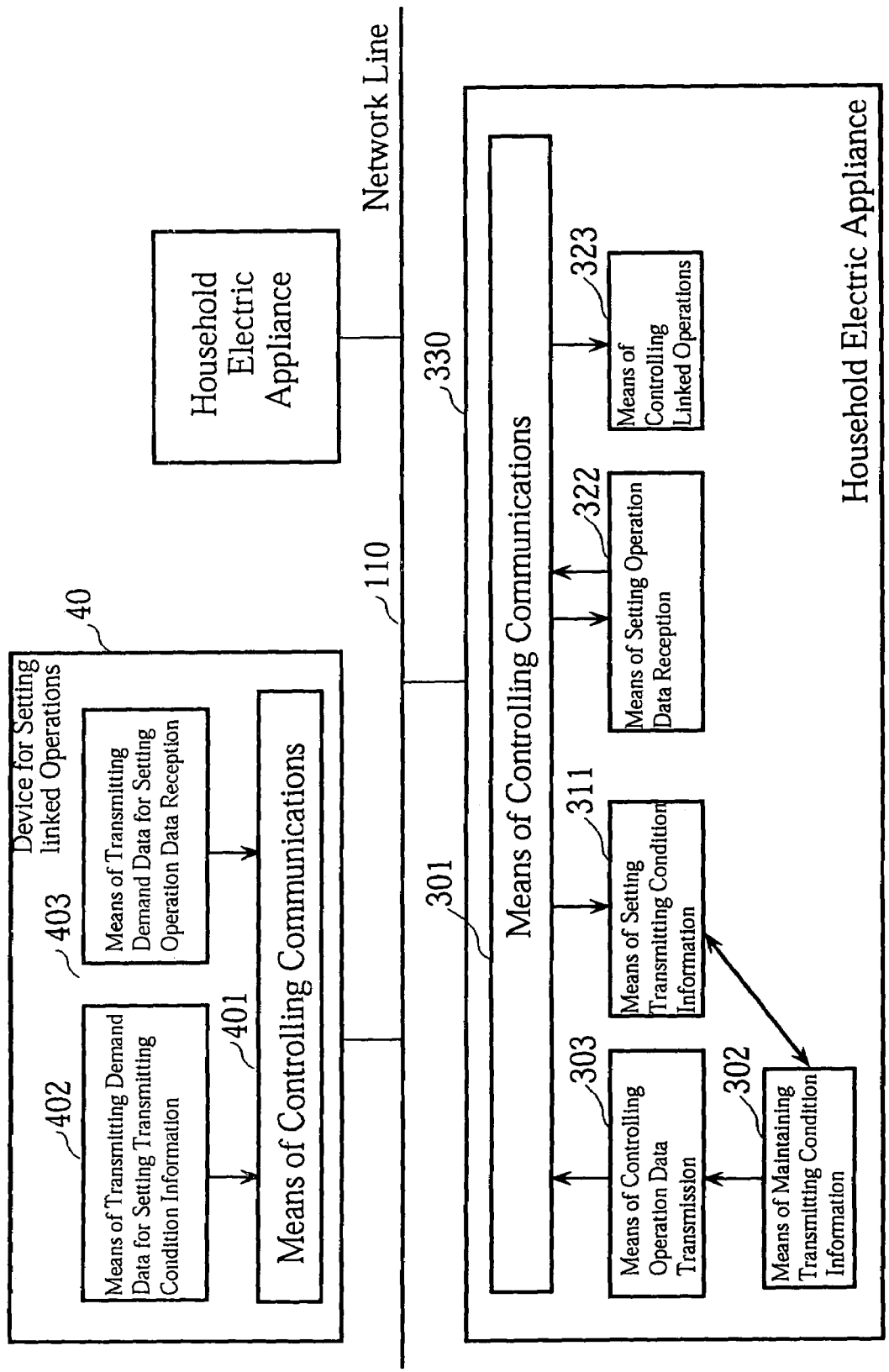
FIG. 12 is a view showing a principal constitution of Embodiment 3 of the present invention.

FIG. 12 shows a constitution of Embodiment 3.

In FIG. 12, 40 is a device for setting linked operations, which is connected to a home network system on an introduction of a household electric appliance thereto.

402 is a means of transmitting demand data for setting information of transmitting conditions, which transmits data for setting information of transmitting conditions to the means of setting information of transmitting conditions 311 of a predetermined household electric appliance through the network line 110.

403 is a means of transmitting demand data for setting reception of operation data, which sets a predetermined reception in the means of setting reception of operation data of a household electric appliance.

330 is a household electric appliance in which necessary conditions for linked operations are set by the device for setting linked operations. Except that the data to be maintained are set by the device for setting linked operations, the functions of the means of maintaining information of transmitting conditions 302, the means of controlling transmission of operation data 303, the means of setting information of transmitting conditions 311, the means of setting reception of operation data 322 and the means of controlling linked operations 323 are similar to those of Embodiments 1 and 2.

In Embodiment 3, a device comprising an integrated circuit into which a means of communicating, a means of displaying, a means of inputting and various commands are incorporated is necessary in setting initial linked operations and introducing a household electric appliance to a home network system, while the device is unnecessary thereafter and predetermined household electric appliances are linkedly operated without a controller.

Specifically, a personal computer reads in a program in setting a home network; a necessary circuit for a home network is incorporated in advance into household electric appliances connected thereto; the program accesses all of the household electric appliances by a signal of a wireless or an electric wire for every setting object in the home network such as air conditioning and energy saving; and the program displays the household electric appliances and the items of linked operations depending on the situation, leading to proper setting of linked operations and necessary displays. Furthermore, predetermined household electric appliances are linkedly operated without a controller, resulting in less electric power consumption. (A software and a hardware in consideration of a home network system are incorporated into household electric appliances in the stage of manufacturing.)

Embodiment 4

Figure 13:
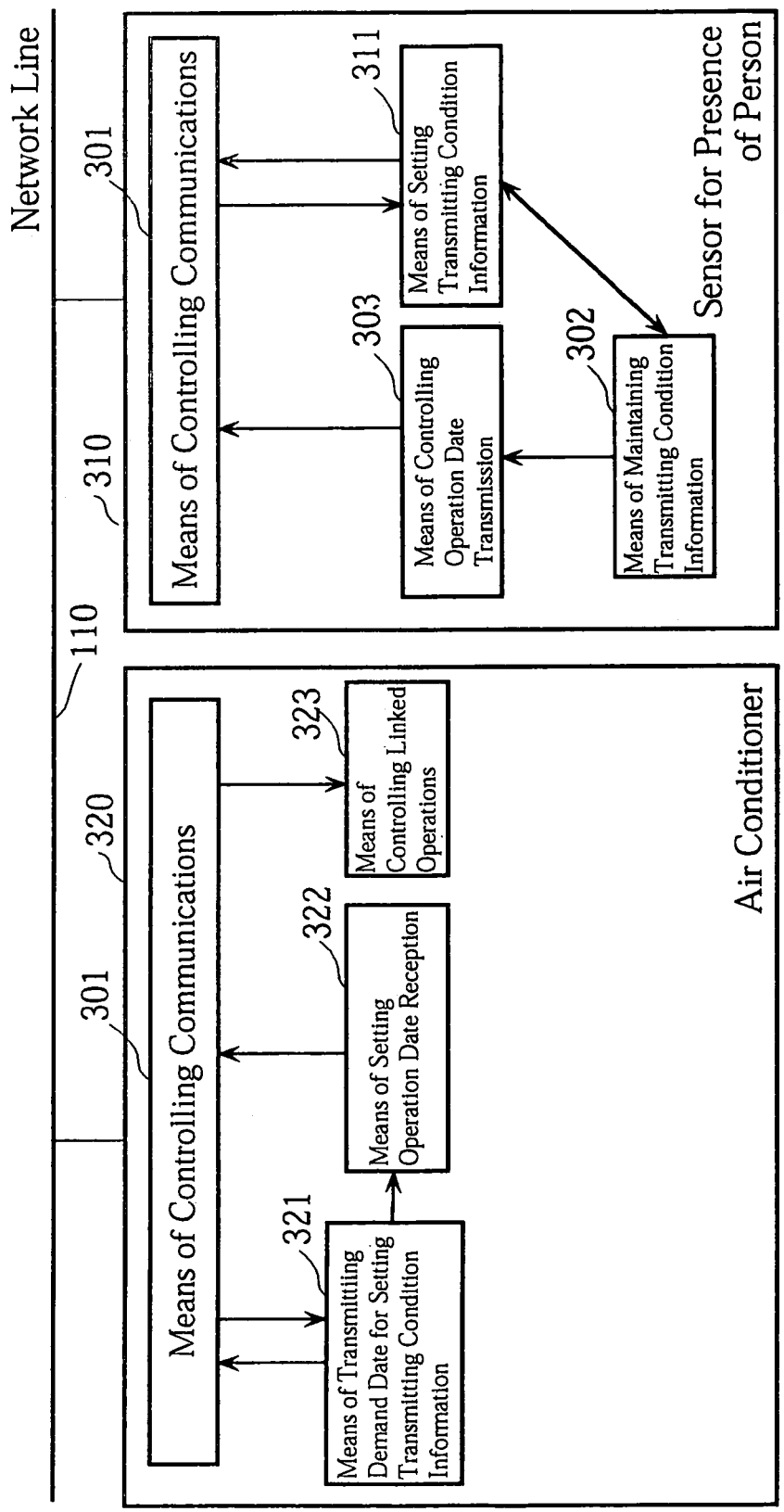
FIG. 13 is a view showing a principal constitution of Embodiment 4 of the present invention.
Figure 14:
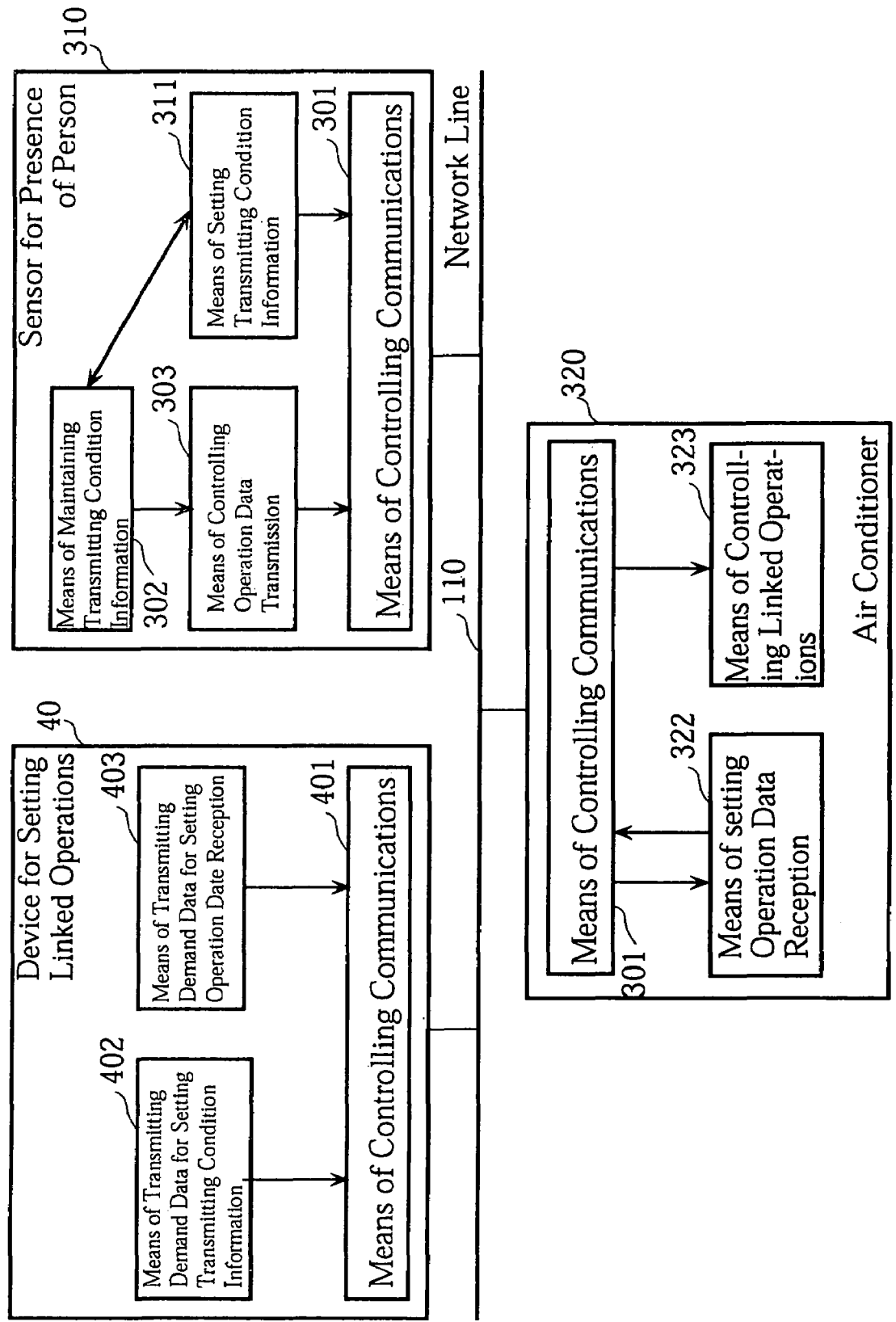
FIG. 14 is a view showing a principal constitution of Embodiment 4 of the present invention (in the case of comprising a device for setting linked operations).

Embodiment 4 applies Embodiments 2 and 3 to an air conditioner to be linkedly operated after receiving the data from a sensor for the presence of persons. FIG. 13 shows an application of Embodiment 2 and FIG. 14 shows an application of Embodiment 3.

In Embodiment 4, a sensor for the presence of persons is installed in a room provided with an air conditioner so as to detect the presence of persons by infrared ray from the persons and a movement of the source of infrared ray.

A sensor for the presence of persons detects the absence of persons to inform an air conditioner of the absence. Thereafter, the air conditioner informed thereof is leveled down in its power, and is switched off and on standby after the absence for a predetermined time such as an hour. In the case of few persons in offices, the air conditioner may be leveled down in its power or an angle of a damper thereof may be decreased.

Alternatively, an electric current meter is applied in substitution for a sensor for the presence of persons so that the electric power consumption of an air conditioner is maintained at a predetermined value or less and the electric power consumption in the whole house or office is maintained at a predetermined value or less. Thus, the electric power consumption of another appliance such as a personal computer can be increased in a house or a building. A fan around an air conditioner can start to be operated in accordance with a decrease in the power level of the air conditioner. In an office, an air conditioner can be leveled up in its power so as to cool the office during nonuse of a word processor, a personal computer and the like at lunchtime and before work in the morning as well as when indoor temperature is preferably lowered due to the walking of an office worker. After starting work the air conditioner can be leveled down in its power so that the indoor temperature gradually changes to a temperature appropriate for desk work and thereafter somewhat high temperature with a decrease in electric power consumption, and consequently the office worker can maintain motivations (the office worker loses motivations and becomes sleepy due to the maintenance of a certain temperature, resulting in a decrease in the efficiency of working for the whole office).

Embodiment 5

Figure 15:
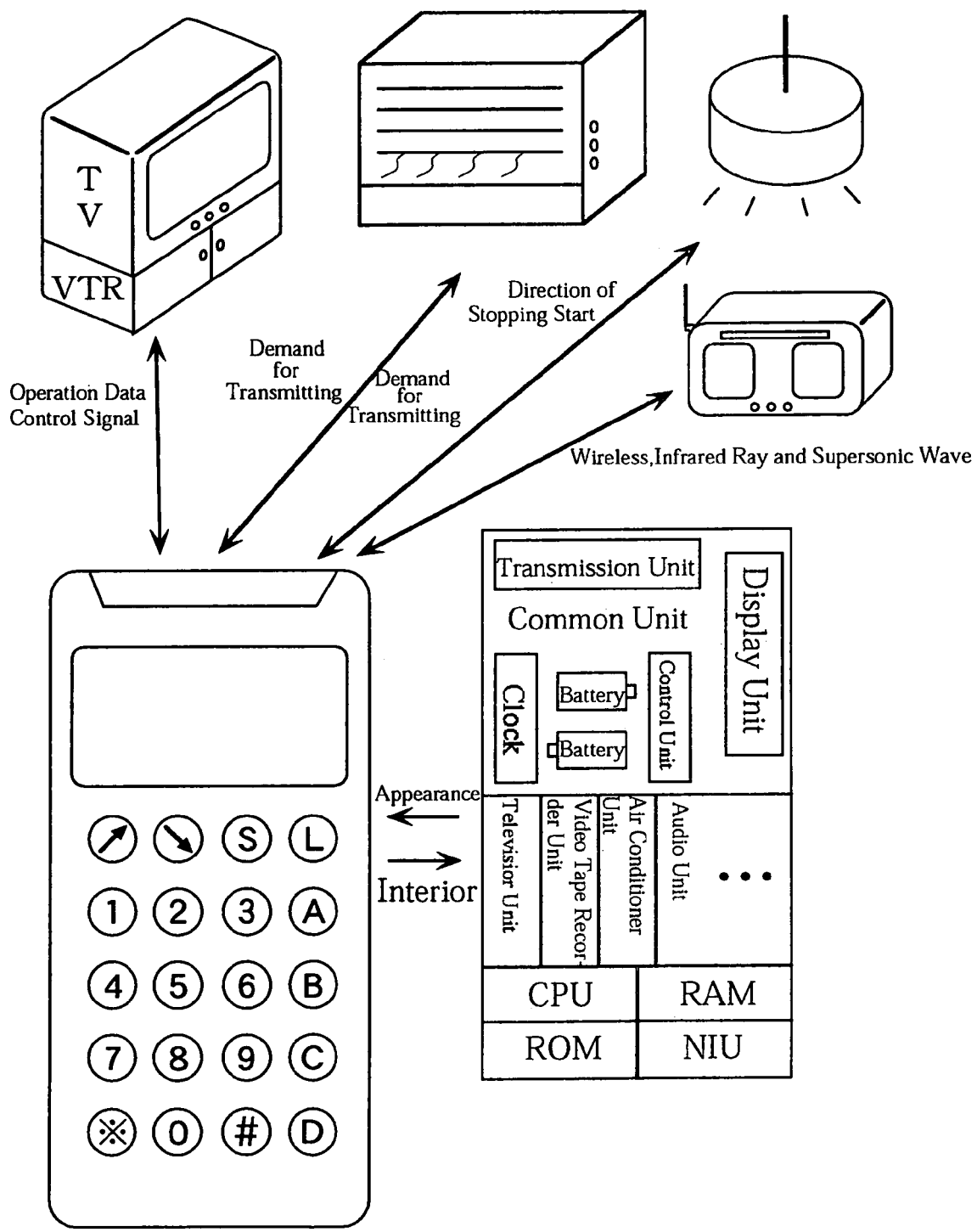
FIG. 15 is a view showing a principal constitution of Embodiment 5 of the present invention.

Embodiment 5 incorporates an integrated control device for a home network system into a remote controller (a remote control device for a user) common to an air conditioner, a televisor, a video tape recorder and the like. FIG. 15 shows a constitution of Embodiment 5.

A remote controller common to an air conditioner, a televisor, a video tape recorder and an audio appliance has been usable or frequently considered to be usable in recent years.

In this case, the remote controller not merely comprises a transmitter of infrared ray or electromagnetic wave for controlling the operations of various appliances but also instantaneously causes the control of a user to be reflected in a transmission of a direction to an appliance to be controlled. Accordingly, in the case of an air conditioner, a televisor and a video tape recorder, it is particularly made more effective that various appliances in a home network system are operated with the reflection of the control of the user, for example, an adjustment of electric power consumption, an open and shut of a curtain and a window blind, and a switch-on of an illuminator linked with a clock.

In addition, when total electric power consumption of household electric appliances surpasses a limited value due to a switch-on and a power level-up of a household electric appliance by the user, the remote controller displays thereabout so as to cause the user to choose which another household electric appliance is switched off. Thus, an inconvenience due to a sudden blowout of a fuse and a switch-off of NFB can be prevented such that not merely all appliances including an illuminator are suddenly switched off at nighttime but also all data being currently stored in a word processor are deleted.

The remote controller can easily warn the user of an unnatural direction such that an air conditioner is switched on during the operation of a warm air circulator.

The present invention was described above based on the embodiments and is not limited thereto. That is, the following changes and modifications may be made thereto.

1) An appliance connected to a home network system does not have elements (constitutions, requirements and specified matters) of the present invention.

2) The manners of claims are concurrently employed. That is, an appliance is controlled by a controller, while another appliance is not controlled.

3) In Embodiment 3, an initial setting is executed also using an exclusive connection line.

4) A utilized appliance is not a household electric appliance but a sensor for the presence of persons, electric power consumption and illuminance. Thus, a utilizing appliance such as an air conditioner and an illuminator is leveled down in its power or switched off in the absence of persons. Alternatively, a utilized appliance is a switch. Thus, a heater using kerosene for fuel is switched on so that indoor temperature rises and the density of carbon dioxide increases, and thereafter a ventilation fan is switched on.

5) In Embodiment 3, the functions of a personal computer can be used for a means of communicating, a means of displaying and a means of inputting. Consequently, linked operations are substantially set in a disk storing a necessary program. The setting can be executed not merely by plugging in an electric source input unit besides a transmission unit of a wearable device for setting linked operations but also by employing various means such as an input device by a user.

6) Regarding a decrease in total electric power consumption, when a user directs another appliance to be switched on, a remote controller has a function of displaying that the user should choose which appliance is switched off due to the excess in total electric power consumption. The procedures are as follows; an allowance for electric power supply is calculated in advance by total electric power consumption of appliances in operation and a capacity for electric power supply (referring to FIG. 9 (2)), and a warning is displayed if electric power consumption of another appliance which is switched on by the user is not within the allowance (similar to the steps of a1, a3 and a5 in FIG. 3 (2)).

7) An appliance is not limited to a household electric appliance and a home network system is intended not merely for a house but also for a section of an office.

8) When an installation of another appliance in a home network system leads to the presence of plural controllers and means of controlling linked operations therein, a program is incorporated therein such that second controller or second means of controlling linked operations is not operated.

INDUSTRIAL APPLICABILITY

It is to be understood from the above description that linked operations of appliances are easily and flexibly set according to the present invention.

An embodiment offers less electric power consumption.

An inconvenience due to a user's careless control can be prevented.

What is claimed is:

1. A method of setting a transmitting condition of data of a first appliance in a home network system for controlling a plurality of appliances including the first appliance and a second appliance linked with the first appliance, the method comprising:

transmitting by the first appliance a demand querying the second appliance whether to be operated in linkage with the first appliance;

deciding by the first appliance based on a response from the second appliance that the second appliance should be operated in linkage with the first appliance;

transmitting by the first appliance first demand information for querying information about a transmitting condition of data indicating an operational status of the second appliance for linked operation of the first appliance and the second appliance;

receiving by the first appliance in response to the first demand information, response information from the second appliance; and transmitting by the first appliance to the second appliance second demand information to set the transmitting condition of data indicating the operation status of the second appliance for linked operation of the first appliance and the second appliance, when the response information does not contain information about the transmitting condition of the data indicating the operational status of the second appliance, or the transmitting condition has not yet been in the second appliance.

2. The method according to claim 1, further comprising receiving by the first appliance data indicating the operational status of the second appliance based on the transmitting condition set in the second appliance.

3. The method according to claim 1, wherein the information about the transmitting condition of the data indicating the operational status of the second appliance comprises first transmission designating information for designating that the transmission of the data be performed upon change in the operational status of the second appliance and second transmission designating information for designating that the transmission of the data be performed in a broadcast manner or to a specific address.

4. The method according to claim 1, wherein the information about the transmitting condition of the data indicating the operational status of the second appliance comprises first transmission designating information for designating tat the transmission of the data be performed periodically, an information about an interval for the transmission of the data, and second transmission designating information for designating that the transmission of the data be performed in a broadcast manner or to a specific address.

5. The method according to claim 3, wherein the information about the transmitting condition of the data of the operational status of the second appliance comprises information about a recipient of the data of the operational status of the second appliance.

6. The method according to claim 4, wherein the information about the transmitting condition of the data of the operational status of the second appliance comprises information about a recipient of the data of the operational status of the second appliance.

7. A first appliance in a home network system for controlling a plurality of appliances including a first appliance and a second appliance, the first appliance comprising:

first means for transmitting a demand for querying the second appliance whether to be operated in linkage with the first appliance;

means for deciding based on a response from the second appliance that the second appliance should be operated in linkage with the first appliance;

second means for transmitting demand information for querying information about a transmitting condition of data indicating an operational status of the second appliance for linked operation of the first appliance and the second appliance;

means for receiving, in response to the demand information, response information from the second appliance; and means for demanding the second appliance to set the transmitting condition of the data indicating the operational status of the second appliance for linked operation of the first appliance and the second appliance, when the response information does not contain information about the transmitting condition of the data indicating the operational status of the second appliance, or the transmitting condition has not yet been set in the second appliance.

8. A method of controlling an appliance in a home network system for controlling a plurality of appliances, the method comprising:
   transmitting by the first appliance a demand querying the second appliance whether to be operated in linkage with the first appliance;
   deciding by the first appliance based on a response from the second appliance that the second appliance should be operated in linkage with the first appliance;
   maintaining in a first appliance, condition information about the appliance and setting information for communicating the condition information to a second appliance;
   transmitting from the first appliance, the condition information to the second appliance in accordance with the communication settings; and
   controlling a linked operation for controlling an efficient operation of the second appliance in accordance with the condition information of the first appliance.

9. The method according to claim 8, wherein the setting information comprises first timing information indicating communication of the condition information upon every change in the condition information or second timing information indicating periodic communication of the condition information.

10. The method according to claim 8, wherein the setting information comprises information indicating presence or absence of at least one of the first and second timing information.

11. The method according to claim 8, wherein the setting information comprises information about a time interval of the periodic communication.

12. The method according to claim 11, wherein the setting information comprises information about an address of a receiver.

13. The method according to claim 9, wherein the setting information comprises information about a time interval of the periodic communication.

14. The method according to claim 13, wherein the setting information comprises information about an address of an informed system-connected object.

15. The method according to claim 11, wherein the setting information comprise information about a time interval of the periodic communication.

16. The method according to claim 15, wherein the setting information comprises information about an address of an informed system-connected object.

17. The method according to claim 8, wherein the setting information comprises information about an address of an informed system-connected object.

18. The method according to claim 9, wherein the setting information comprises information about an address of an informed system-connected object.

19. The method according to claim 10, wherein the setting information comprises information about an address of an informed system-connected object.

20. A method of controlling a first appliance in a home bus system for controlling a plurality of appliances comprising a first appliance and a second appliance, the method comprising:
    transmitting by the first appliance a demand querying the second appliance whether to be operated in linkage with the first appliance;
    deciding by the first appliance based on a response from the second appliance that the second appliance should be operated in linkage with the first appliance;
    maintaining condition information in the first appliance;
    transmitting predetermined data to the second appliance when the condition information meets designated transmitting conditions; and
    controlling a linked operation for controlling an efficient operation of the second appliance in accordance with the condition information of the first appliance.

21. The method according to claim 20, wherein information about the transmitting conditions comprises first information about a transmission designation indicating that transmission is made for every change in the condition information, and second information about a transmission designation indicating that transmission is made to a broadcast address or to a specific address.

22. The method according to claim 21, wherein the information about the transmitting conditions comprises information about a receiver.

23. The method according to claim 20, wherein information about the transmitting conditions comprises a transmission designation indicating that transmission is made periodically, information about a time interval for transmission, and information about a transmission designation indicating that transmission is made to a broadcast address or to a specific address.

24. The method according to claim 23, wherein the information about the transmitting condition comprises information about a receiver.

25. A method of controlling a second appliance in a home bus system for controlling a plurality of appliances comprising a first appliance and a second appliance, the method comprising:
    transmitting by the first appliance a demand querying the second appliance whether to be operated in linkage with the first appliance;
    deciding by the first appliance based on a response from the second appliance that the second appliance should be operated in linkage with the first appliance;
    receiving and maintaining in a second appliance, data transmitted from the first appliance;
    self-controlling by the second appliance in accordance with the data; and
    controlling a linked operation for controlling an efficient operation of the second appliance in accordance with the condition information of the first appliance.

26. A method of controlling a second appliance in a home bus system for controlling a plurality of appliances comprising a first appliance and a second appliance, the method comprising:
    transmitting by the first appliance a demand querying the second appliance whether to be operated in linkage with the first appliance;
    deciding by the first appliance based on a response from the second appliance that the second appliance should be operated in linkage with the first appliance;
    receiving in a second appliance, data transmitted from the first appliance;
    linking between second and first appliances based on the received data;
    storing information in the second appliance, about the first appliance upon linkage with the first appliance; and controlling a linked operation for controlling an efficient operation of the second appliance in accordance with the condition information of the first appliance.

27. A method of setting conditions for transmission of data about a first appliance in a home bus system for controlling a plurality of appliances comprising the first appliance and a second appliance, the method comprising:
   transmitting demand information from a first appliance for querying presence or absence of the second appliance, wherein the first appliance is for controlling the second appliance by a communication linkage;
   receiving in the first appliance, response information transmitted by the second appliance in response to the demand information transmitted by the first appliance;
   transmitting by a first appliance, a setting demand to the second appliance for causing the second appliance to set transmitting conditions, when the response information does not include information about the second appliance transmitting conditions or when transmitting conditions are not set; and
   controlling a linked operation for controlling an efficient operation of the second appliance in accordance with the condition information of the first appliance.

28. A first appliance in a home bus system for controlling a plurality of appliances, comprising:
   transmitting means for transmitting from a first appliance a demand for querying another appliance whether to be operated in linkage with the first appliance;
   deciding means for deciding based on a response from another appliance that another appliance should be operated in linkage with the first appliance;
   condition control means for maintaining attribute information indicating a condition of the appliance;
   setting information maintenance means for maintaining setting information designating a transmission method for every piece of the attribute information;
   attribute transmission means for transmitting the attribute information to another appliance, in accordance with the setting information; and
   linked operation means for controlling an efficient operation of a second appliance in accordance with the condition information of the first appliance.

29. A first appliance in a home bus system for controlling a plurality of appliances comprising a first appliance and a second appliance, the first appliance comprising:
   means for transmitting a demand from the first appliance for querying another appliance whether to be operated in linkage with the first appliance;
   means for deciding based on a response from another appliance that another appliance should be operated in linkage with the first appliance;
   condition control means for maintaining a condition of the first appliance;
   means for maintaining transmitting conditions information for transmission to another appliance;
   data transmission means for transmitting a predetermined data to the second appliance when the first appliance meets the transmitting conditions; and
   linked operation means for controlling an efficient operation of the second appliance in accordance with the condition information of the first appliance.

30. A first appliance in a home bus system for controlling a plurality of appliances, comprising:
   means for transmitting from a first appliance a demand for querying another appliance whether to be operated in linkage with the first appliance;
   means for deciding based on a response from another appliance that another appliance should be operated in linkage with the first appliance;
   reception means for receiving data transmitted from another appliance;
   conditions maintenance means for maintaining interlock conditions for interlock with another appliance;
   interlock control means for performing interlock control on the appliance when the received data meets the interlock conditions; and
   linked operation means for controlling an efficient operation of another appliance in accordance with the condition information of the first appliance.

31. A first appliance in a home bus system for controlling a plurality of appliances, comprising:
   transmission means for transmitting demand information for querying presence or absence of another appliance to be linked with the appliance;
   reception means for receiving response information transmitted from another appliance in response to the demand information;
   conditions setting demand means for transmitting a setting demand to another appliance for setting transmitting conditions, when the response information does not include information about the transmitting conditions for transmission to the appliance, or when information about the transmitting conditions is not set; and
   linked operation means for controlling and efficient operation of another appliance in accordance with the condition information of the first appliance.

32. The appliance according to claim 31, wherein the transmitting conditions indicate conditions for said another appliance to transmit data to the appliance, the data indicating an operating condition of said another appliance.

33. The appliance according to claim 32, further comprising a linked control means for performing a linked operation in accordance with data about an operating condition of said another appliance, the data being transmitted from said another appliance.

34. A first appliance in a home bus system for controlling a plurality of appliances, comprising:
   transmission means for transmitting demand information for querying presence or absence of another appliance to be linked with the first appliance;
   reception means for receiving demand information from another appliance, the demand information querying presence or absence of another appliance to be operated in linkage with the first appliance;
   conditions maintenance means for maintaining information about transmitting conditions for linkage with another appliance;
   search means for searching for the information about transmitting conditions for linkage with the appliance from the conditions maintenance means;
   transmission means for transmitting response information comprising the information about transmitting conditions, in response to the demand information; and
   linked operation means for controlling an efficient operation in another appliance in accordance with the condition information of the first appliance.

35. The appliance according to claim 34, further comprising an operation condition data control means for maintaining an operating condition, wherein
   the appliance is for transmitting an operating condition of the appliance to another appliance, in accordance with the transmitting conditions.

* * * * *

UNITED STATES PATENT AND TRADEMARK OFFICE
CERTIFICATE OF CORRECTION

PATENT NO. : 6,980,079 B1
APPLICATION NO. : 09/787030
DATED : December 27, 2005
INVENTOR(S) : Yasuyuki Shintani et al.

It is certified that error appears in the above-identified patent and that said Letters Patent is hereby corrected as shown below:

column 18, line 32: replace "tat" with -- that --.
column 19, claim 15, line 2: replace "comprise" with --comprises--.

Signed and Sealed this

Fifth Day of September, 2006

JON W. DUDAS
*Director of the United States Patent and Trademark Office*